(12) United States Patent
Shahana et al.

(10) Patent No.: US 11,787,500 B2
(45) Date of Patent: Oct. 17, 2023

(54) HUMAN-POWERED VEHICLE CONTROL DEVICE

(71) Applicant: Shimano Inc., Osaka (JP)

(72) Inventors: Satoshi Shahana, Osaka (JP); Hitoshi Takayama, Osaka (JP)

(73) Assignee: Shimano Inc., Osaka (JP)

( * ) Notice: Subject to any disclaimer, the term of this patent is extended or adjusted under 35 U.S.C. 154(b) by 121 days.

(21) Appl. No.: 16/933,216

(22) Filed: Jul. 20, 2020

(65) Prior Publication Data

US 2021/0031872 A1    Feb. 4, 2021

(30) Foreign Application Priority Data

Jul. 31, 2019   (JP) ................. 2019-140821

(51) Int. Cl.
| | | |
|---|---|---|
| *B62M 6/50* | (2010.01) | |
| *B62M 1/36* | (2013.01) | |
| *B62M 9/04* | (2006.01) | |
| *B62M 6/45* | (2010.01) | |

(52) U.S. Cl.
CPC ............... *B62M 6/50* (2013.01); *B62M 1/36* (2013.01); *B62M 6/45* (2013.01); *B62M 9/04* (2013.01)

(58) Field of Classification Search
CPC . B62M 6/45; B62M 6/50; B62M 1/36; B62M 9/04; B62M 9/123; B62J 45/412; B62J 45/413; B62J 45/411
See application file for complete search history.

(56) References Cited

U.S. PATENT DOCUMENTS

| | | | | |
|---|---|---|---|---|
| 5,599,244 A | * | 2/1997 | Ethington | ............... B62M 9/122 280/261 |
| 5,664,636 A | * | 9/1997 | Ikuma | ...................... B62M 6/45 180/206.1 |
| 5,777,442 A | * | 7/1998 | Miyata | ..................... B62M 6/55 318/2 |

(Continued)

FOREIGN PATENT DOCUMENTS

| | | |
|---|---|---|
| JP | 9-156571 A | 6/1997 |
| JP | 2014-151745 A | 8/2014 |

(Continued)

*Primary Examiner* — Jacob D Knutson
*Assistant Examiner* — Abigail R Hymel
(74) *Attorney, Agent, or Firm* — Global IP Counselors, LLP

(57) ABSTRACT

A control device for a human-powered vehicle including a motor that applies a propulsion force to the human-powered vehicle, a crank axle, a driving wheel, and a transmission that automatically changes a transmission ratio of a rotational speed of the driving wheel to a rotational speed of the crank axle in accordance with a travel state of the human-powered vehicle. The control device includes an electronic controller that controls the motor in accordance with a human driving force input to the crank axle. The controller changes an assist state related to at least one of an assist ratio of an assist force by the motor to a predetermined human driving force and the assist force by the motor in accordance with the human driving force and controls the transmission to maintain the transmission ratio upon determining a parameter related to the human driving force satisfies a predetermined condition.

19 Claims, 11 Drawing Sheets

(56) References Cited

U.S. PATENT DOCUMENTS

| | | | |
|---|---|---|---|
| 5,857,537 A * | 1/1999 | Matsumoto | B62M 6/60 |
| | | | 180/206.5 |
| 2012/0130603 A1* | 5/2012 | Simpson | B62M 25/08 |
| | | | 701/51 |
| 2017/0247080 A1 | 8/2017 | Tsuchizawa et al. | |
| 2017/0327184 A1* | 11/2017 | Contello | B62M 6/45 |
| 2018/0056812 A1* | 3/2018 | Hamann | B62M 6/40 |
| 2019/0241234 A1* | 8/2019 | Hattori | B62J 50/22 |
| 2019/0263472 A1* | 8/2019 | Kimpara | B62J 45/411 |
| 2019/0308512 A1* | 10/2019 | Hasumi | B62M 6/50 |
| 2019/0315433 A1* | 10/2019 | Hasumi | B60L 50/20 |

FOREIGN PATENT DOCUMENTS

| | | | | |
|---|---|---|---|---|
| WO | WO-2015073791 A1 * | 5/2015 | | B62M 6/45 |
| WO | WO-2018020259 A1 * | 2/2018 | | |

\* cited by examiner

HUMAN-POWERED VEHICLE CONTROL DEVICE

CROSS-REFERENCE TO RELATED APPLICATIONS

This application claims priority to Japanese Patent Application No. 2019-140821, filed on Jul. 31, 2019. The entire disclosure of Japanese Patent Application No. 2019-140821 is hereby incorporated herein by reference.

BACKGROUND

Technical Field

The present invention generally relates to a human-powered vehicle control device.

Background Information

Some human-powered vehicle are provided with a human-powered vehicle control device that controls a transmission of the human-powered vehicle. Japanese Laid-Open Patent Publication No. 2014-151745 (Patent Document 1) discloses an example of a human-powered vehicle control device. In a case where actuation of a transmission is requested, the control device decreases an assist torque in accordance with human driving force and then actuates the transmission.

SUMMARY

One object of the present disclosure is to provide a human-powered vehicle control device that is capable of controlling a transmission in a preferred manner.

A human-powered vehicle control device in accordance with a first aspect of the present disclosure is a control device for a human-powered vehicle. The human-powered vehicle includes a motor configured to apply a propulsion force to the human-powered vehicle, a crank axle, a driving wheel, and a transmission configured to automatically change a transmission ratio of a rotational speed of the driving wheel to a rotational speed of the crank axle in accordance with a travel state of the human-powered vehicle. The control device comprises an electronic controller configured to control the motor in accordance with human driving force input to the crank axle. The electronic controller is further configured to change an assist state related to at least one of an assist ratio of assist force generated by the motor to predetermined human driving force and the assist force generated by the motor in accordance with the human driving force. The electronic controller is further configured to control the transmission to maintain the transmission ratio upon determining a parameter related to the human driving force satisfies a predetermined condition.

The control device according to the first aspect maintains the transmission ratio if the parameter related to the human driving force satisfies the predetermined condition even upon determining the condition for changing the transmission ratio in accordance with the travel state of the human-powered vehicle is satisfied. Thus, the transmission is controlled in a further preferred manner.

In accordance with a second aspect of the present disclosure, the control device according to the first aspect is configured so that the parameter related to the human driving force includes a peak value of the human driving force. The electronic controller is configured to determine the predetermined condition is satisfied upon determining the peak value of the human driving force is included in a range greater than or equal to a first threshold value.

The control device according to the second aspect controls the transmission based on the peak value of the human driving force in a further preferred manner.

In accordance with a third aspect of the present disclosure, the control device according to the second aspect is configured so that the electronic controller is configured to determine the predetermined condition is satisfied upon determining the peak value of the human driving force is included in a range greater than or equal to a second threshold value that is smaller than the first threshold value after the peak value of the human driving force becomes greater than or equal to the first threshold value.

The control device according to the third aspect controls the transmission based on the peak value of the human driving force in a further preferred manner.

In accordance with a fourth aspect of the present disclosure, the control device according to the first aspect is configured so that the parameter related to the human driving force includes a peak value of the human driving force. The electronic controller is configured to determine the predetermined condition is satisfied over a first time from a state in which the peak value of the human driving force becomes included in a range greater than or equal to a first threshold value.

The control device according to the fourth aspect controls the transmission based on the relationship of the peak value of the human driving force and time in a further preferred manner.

In accordance with a fifth aspect of the present disclosure, the control device according to the first aspect is configured so that the parameter related to the human driving force includes a peak value of the human driving force and a number of the peak values of the human driving force. The electronic controller is configured to determine the predetermined condition is satisfied upon determining the peak value of the human driving force is included in a range greater than or equal to a first threshold value successively for a predetermined first number of occurrences.

The control device according to the fifth aspect controls the transmission based on the relationship of the peak value of the human driving force and the number of the peak values in a further preferred manner.

In accordance with a sixth aspect of the present disclosure, the control device according to the first aspect is configured so that the electronic controller is configured to determine the parameter related to the human driving force includes a peak value of the human driving force. The predetermined condition is satisfied upon determining the peak value of the human driving force is included in a range greater than or equal to a second threshold value that is smaller than a first threshold value after the peak value of the human driving force is included in a range greater than or equal to the first threshold value successively for a predetermined first number of occurrences.

The control device according to the sixth aspect controls the transmission based on the relationship of the peak value of the human driving force and the number of the peak values in a further preferred manner.

In accordance with a seventh aspect of the present disclosure, the control device according to the first aspect is configured so that the parameter related to the human driving force includes a peak value of the human driving force and a number of the peak values of the human driving force. The electronic controller is configured to determine the predetermined condition is satisfied after the peak value of the human driving force is included in a range greater than or equal to a first threshold value successively for a predetermined first number of occurrences until the peak value of the human driving force is included in a range less than a second threshold value that is smaller than the first threshold value successively for a predetermined second number of occurrences.

The control device according to the seventh aspect controls the transmission based on the relationship of the peak value of the human driving force and the number of the peak values in a further preferred manner.

In accordance with an eighth aspect of the present disclosure, the control device according to the first aspect is configured so that the parameter related to the human driving force includes a peak value of the human driving force and a number of the peak values of the human driving force. The electronic controller is configured to determine the predetermined condition is satisfied over a second time from a state in which the peak value of the human driving force becomes included in a range greater than or equal to a first threshold value successively for a predetermined first number of occurrences.

The control device according to the eighth aspect controls the transmission based on the relationship of the peak value of the human driving force and time in a further preferred manner.

In accordance with a ninth aspect of the present disclosure, the control device according to the first aspect is configured so that the parameter related to the human driving force includes a peak value of the human driving force and a number of the peak values of the human driving force. The electronic controller is configured to determine the predetermined condition is satisfied after the peak value of the human driving force becomes greater than or equal to a first threshold value until the peak value of the human driving force is included in a range less than a second threshold value that is smaller than the first threshold value successively for a predetermined second number of occurrences.

The control device according to the ninth aspect controls the transmission based on the relationship of the peak value of the human driving force and the number of the peak values in a further preferred manner.

In accordance with a tenth aspect of the present disclosure, the control device according to any one of the first to ninth aspects is configured so that the assist state includes a first assist state and a second assist state having at least one of a maximum value of the assist ratio and an upper limit value of the assist force that is greater than that of the first assist state. The electronic controller is configured to switch between the first assist state and the second assist state in accordance with the human driving force.

The control device according to the tenth aspect switches the assist state in accordance with the human driving force in a preferred manner.

In accordance with an eleventh aspect of the present disclosure, the control device according to the tenth aspect is configured so that the electronic controller is configured to change the assist state from the first assist state to the second assist state upon determining the parameter related to the human driving force satisfies the predetermined condition.

The control device according to the eleventh aspect changes the assist state in a state in which the transmission ratio is maintained. This avoids failures that can be caused upon determining a large load is applied to the transmission during shifting by the transmission.

A human-powered vehicle control device in accordance with a twelfth aspect of the present disclosure is a control device for a human-powered vehicle. The human-powered vehicle includes a motor configured to apply a propulsion force to the human-powered vehicle, a crank axle, a driving wheel, and a transmission configured to automatically change a transmission ratio of a rotational speed of the driving wheel to a rotational speed of the crank axle in accordance with a travel state of the human-powered vehicle. The control device comprises an electronic controller configured to control the transmission. The electronic controller is further configured to control the transmission to maintain the transmission ratio upon determining a change rate per time of a human driving force input to the crank axle satisfies a predetermined condition.

The control device according to the twelfth aspect maintains the transmission ratio based on the change rate of the human driving force per time even upon determining the condition for changing the transmission ratio is satisfied. Thus, the transmission is controlled in a further preferred manner.

In accordance with a thirteenth aspect of the present disclosure, the control device according to the twelfth aspect is configured so that the electronic controller is configured to determine the predetermined condition is satisfied upon determining an increase in the change rate of the human driving force per time is included in a range greater than or equal to a predetermined first value.

The control device according to the thirteenth aspect controls the transmission based on the change rate of the human driving force per time in a further preferred manner.

In accordance with a fourteenth aspect of the present disclosure, the control device according to the twelfth aspect is configured so that the electronic controller is configured to determine the predetermined condition is satisfied over a third time from a state in which an increase in the change rate of the human driving force per time becomes included in a range greater than or equal to a predetermined first value.

The control device according to the fourteenth aspect controls the transmission based on the relationship of the change rate of the human driving force per time and time in a further preferred manner.

In accordance with a fifteenth aspect of the present disclosure, the control device according to any one of the twelfth to fourteenth aspects is configured so that the electronic controller is configured to decrease a response speed of output of the motor with respect to a change in the human driving force in a state in which the human driving force is decreasing upon determining the change rate per time of the human driving force input to the crank axle satisfies the predetermined condition.

With the control device according to the fifteenth aspect, the output of the motor is gradually decreased upon determining the change rate of the human driving force per time satisfies the predetermined condition. This limits decreases in the propulsion force applied to the human-powered vehicle.

A human-powered vehicle control device in accordance with a sixteenth aspect of the present disclosure is a control device for a human-powered vehicle. The human-powered vehicle includes a motor configured to apply a propulsion force to the human-powered vehicle. The control device comprises an electronic controller configured to control the motor in accordance with human driving force input to the human-powered vehicle. The electronic controller is further configured to change an assist state related to at least one of an assist ratio of assist force generated by the motor to a predetermined human driving force and the assist force generated by the motor in accordance with the human driving force. The assist state includes a first assist state and a second assist state having a maximum value of the assist ratio or an upper limit value of the assist force that is greater than that of the first assist state. The electronic controller is further configured to switch between the first assist state and the second assist state in accordance with a change rate of the human driving force per time.

The control device according to the sixteenth aspect switches the assist state based on the change rate of the human driving force per time in a preferred manner.

In accordance with a seventeenth aspect of the present disclosure, the control device according to the sixteenth aspect is configured so that the electronic controller is configured to switch the assist state from the first assist state to the second assist state upon determining an increase in the change rate of the human driving force per time is a predetermined second value or greater.

The control device according to the seventeenth aspect switches the assist state based on the change rate of the human driving force per time in a preferred manner.

In accordance with an eighteenth aspect of the present disclosure, the control device according to the seventeenth aspect is configured so that the electronic controller is configured to decrease a response speed of output of the motor with respect to a change in the human driving force in a state in which the human driving force is decreasing upon switching from the first assist state to the second assist state.

With the control device according to the eighteenth aspect, the output of the motor is gradually decreased upon determining the electronic controller switches the assist state from the second assist state to the first assist state. This limits decreases in the propulsion force applied to the human-powered vehicle.

In accordance with a nineteenth aspect of the present disclosure, the control device according to any one of the sixteenth to eighteenth aspects is configured so that the electronic controller is configured to switch the assist state from the second assist state to the first assist state upon determining a decrease in the change rate of the human driving force per time is a predetermined third value or greater.

The control device according to the nineteenth aspect changes the assist state based on the change rate of the human driving force per time in a preferred manner.

In accordance with a twentieth aspect of the present disclosure, the control device according to the nineteenth aspect is configured so that the electronic controller is configured to increase the response speed of output of the motor with respect to a change in the human driving force in a state in which the human driving force is decreasing upon switching from the second assist state to the first assist state.

With the control device according to the twentieth aspect, the output of the motor is readily decreased upon determining the electronic controller switches the assist state from the second assist state to the first assist state. This readily decreases the propulsion force applied to the human-powered vehicle.

The control device for a human-powered vehicle in accordance with the present disclosure controls at least one of a transmission mounted on the human-powered vehicle and a motor configured to apply propulsion force to the human-powered vehicle in a further preferred manner.

BRIEF DESCRIPTION OF THE DRAWINGS

Referring now to the attached drawings which form a part of this original disclosure.

DETAILED DESCRIPTION OF EMBODIMENTS

Figure 1:
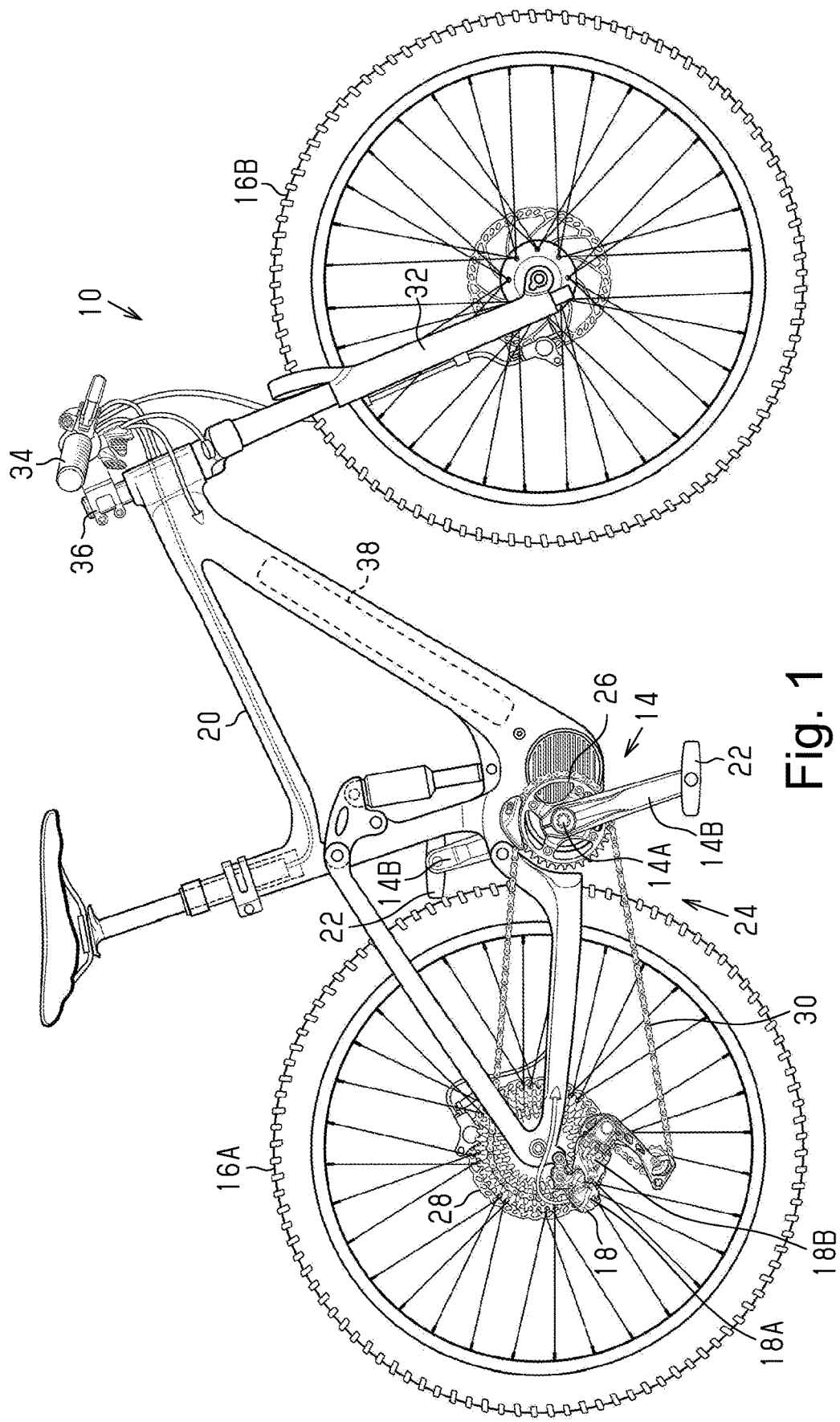
FIG. 1 is a side elevational view of a human-powered vehicle including a control device in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle control device 40 in accordance with a first embodiment will now be described with reference to FIGS. 1 to 8. Hereinafter, the human-powered vehicle control device 40 will be simply referred to as the control device 40. A human-powered vehicle 10 is a vehicle that can be driven by at least human driving force H. Examples of the human-powered vehicle 10 include various types of bicycles such as a mountain bike, a road bike, a city bike, a cargo bike, and a recumbent bicycle, as well as an electric bicycle (E-bike). There is no limit to the number of wheels of the human-powered vehicle 10. For example, the human-powered vehicle 10 can be a unicycle or a vehicle having three or more wheels. The electric bicycle includes an electric assist bicycle that assists propulsion of the vehicle with an electric motor. In the embodiments described hereafter, the human-powered vehicle 10 will be referred to as a bicycle.

The human-powered vehicle 10 includes a motor 12 that is configured to apply a propulsion force to the human-powered vehicle 10, a crank axle 14A, a driving wheel 16A, and a transmission 18 configured to automatically change a transmission ratio of a rotational speed of the driving wheel 16A to a rotational speed of the crank axle 14A in accordance with a travel state of the human-powered vehicle 10.

The human-powered vehicle 10 further includes a driven wheel 16B, a crank 14, and a frame 20. In the present embodiment, the driving wheel 16A includes a rear wheel, and the driven wheel 16B includes a front wheel. The human driving force H is input to the crank 14. The crank 14 includes the crank axle 14A and two crank arms 14B. The crank axle 14A is rotatably supported by the frame 20. The two crank arms 14B are provided on two ends of the crank axle 14A, respectively. Two pedals 22 are connected to the crank arms 14B, respectively. The driving wheel 16A is driven by the rotation of the crank 14. The driving wheel 16A is supported by the frame 20. The crank 14 is connected to the driving wheel 16A by a drive mechanism 24. The drive mechanism 24 includes a first rotational body 26 coupled to the crank axle 14A. The crank axle 14A and the first rotational body 26 can be coupled so that the crank axle 14A and the first rotational body 26 are rotated integrally. Alternatively, the crank axle 14A and the first rotational body 26 can be coupled by a first one-way clutch. The one-way clutch is configured to rotate the first rotational body 26 in a case where the crank 14 is rotated forward and allow the crank 14 and the first rotational body 26 to rotate relative to each other in a case where the crank 14 is rotated rearward. The first one-way clutch includes, for example, a roller switch, a low clutch, a sprag clutch, a ratchet clutch, or the like. The first rotational body 26 includes a sprocket, a pulley, or a bevel gear. The drive mechanism 24 further includes a second rotational body 28 and a linking member 30. The linking member 30 is configured to transmit the rotational force of the first rotational body 26 to the second rotational body 28. The linking member 30 includes, for example, a chain, a belt, or a shaft.

The second rotational body 28 is connected to the driving wheel 16A. The second rotational body 28 includes a sprocket, a pulley, or a bevel gear. Preferably, a second one-way clutch is provided between the second rotational body 28 and the driving wheel 16A. The second one-way clutch is configured to rotate the driving wheel 16A in a case where the second rotational body 28 is rotated forward and allow the second rotational body 28 and the driving wheel 16A to rotate relative to each other in a case where the second rotational body 28 is rotated rearward. The second one-way clutch includes, for example, a roller switch, a low clutch, a sprag clutch, a ratchet clutch, or the like.

The driving wheel 16A can include a front wheel, and the driven wheel 16B can include a rear wheel. The driving wheel 16A can include a front wheel and a rear wheel. The front wheel is attached to the frame 20 by a front fork 32. A handlebar 34 is connected to the front fork 32 by a stem 36. In the following embodiments, the rear wheel will be referred to as the driving wheel 16A. However, the front wheel can be the driving wheel 16A or both of the front wheel and the rear wheel can be the driving wheels 16A.

The human-powered vehicle 10 includes a human-powered vehicle battery 38. The battery 38 includes one or more battery cells. Each battery cell includes a rechargeable battery. The battery 38 is configured to supply electric power to an electronic controller 42 of the control device 40. Preferably, the battery 38 is connected to the electronic controller 42 of the control device 40 by an electric wire or a wireless communication unit in a manner allowing for communication. Hereinafter, the electronic controller 42 will be simply referred to as the controller 42. The battery 38 can be capable of communicating with the controller 42 of the control device 40, through, for example, power line communication (PLC).

The transmission 18 is configured to change a transmission ratio R of the rotational speed of the driving wheel 16A to the rotational speed of the crank axle 14A. Preferably, the transmission 18 is configured to change the transmission ratio R in a stepped manner. The transmission 18 includes an electric actuator 18A and a transmission body 18B that is driven by the electric actuator 18A. The controller 42 of the control device 40 is configured to control the electric actuator 18A. The electric actuator 18A includes an electric motor and a drive circuit configured to control the electric power applied to the electric motor. The electric actuator 18A is configured to have the transmission body 18B perform a shifting action. The drive circuit included in the electric actuator 18A is connected to the controller 42 by an electric wire or a wireless communication unit in a manner allowing for communication. The electric actuator 18A is configured to be capable of communicating with the controller 42 through, for example, power line communication. The electric actuator 18A is configured to have the transmission body 18B perform a shifting action in response to a control signal from the controller 42. The transmission 18 includes, for example, at least one of an internal hub transmission device and a derailleur. In a case where the transmission 18 includes an internal hub transmission device, the internal hub transmission device is provided on the driving wheel 16A. A derailleur includes at least one of a front derailleur and a rear derailleur. In a case where the transmission 18 includes a front derailleur, the first rotational body 26 includes a plurality of sprockets. In a case where the transmission 18 includes a rear derailleur, the second rotational body 28 includes a plurality of sprockets. In the present embodiment, the transmission 18 includes a rear derailleur. Various types of transmission devices such as a continuously variable transmission (CVT) can be used as the transmission 18 as long as the transmission device is configured to change the transmission ratio R of the rotational speed of the driving wheel 16A to the rotational speed of the crank axle 14A. The transmission 18 can be provided, for example, in a power transmission path between the crank 14 and the first rotational body 26.

The motor 12 includes one or more electric motors. The electric motor includes, for example, a brushless motor. The motor 12 is configured to transmit rotation to at least one of the front wheel 16B and the power transmission path of the human driving force extending from the pedals 22 to the rear wheel 16A. The power transmission path of the human driving force extending from the pedals 22 to the rear wheel 16A includes the rear wheel 16A. In the present embodiment, the motor 12 is provided on the frame 20 of the human-powered vehicle 10 and configured to transmit rotational force to the first rotational body 26. The motor 12 and a housing on which the motor 12 is provided define a drive unit. Preferably, a third one-way clutch is provided in the power transmission path between the motor 12 and the crank axle 14A to restrict transmission of the rotational force of the crank 14 to the motor 12 in a case where the crank axle 14A is rotated in a direction in which the human-powered vehicle 10 moves forward. The third one-way clutch includes, for example, a roller switch, a low clutch, a sprag clutch, a ratchet clutch, or the like. In a case where the motor 12 is provided on at least one of the rear wheel 16A and the front wheel 16B, the motor 12 can be a hub motor.

The control device 40 includes the controller 42 configured to control the motor 12 in accordance with the human driving force H input to the crank axle 14A. The controller 42 includes one or more processors 42A that execute a predetermined control program. The processor 42A includes, for example, a central processing unit (CPU) or a micro-processing unit (MPU). The processors can be located at separate positions. The controller 42 can include one or more microcomputers. The terms "controller" and "electronic controller" as used herein refers to hardware that executes a software program, and does not include a human. The control device 40 further includes storage 44. The storage 44 stores information used for various types of control programs and control processes. The storage 44 includes any computer storage device or any non-transitory computer-readable medium with the sole exception of a transitory, propagating signal. For example, the storage 44 includes a nonvolatile memory and a volatile memory. A non-volatile memory includes, for example, at least one of a read-only memory (ROM), an erasable programmable read-only memory (EPROM), an electrically erasable programmable read-only memory (EEPROM), and a flash memory. A volatile memory includes, for example, a random access memory (RAM). The storage 44 stores information on the transmission ratio R that can be set by the transmission 18. Preferably, the storage 44 stores information on every transmission ratio R that can be set by the transmission 18. Preferably, the controller 42 includes at least one of a clock and a timer.

Preferably, the control device 40 further includes a drive circuit 46 of the motor 12. Preferably, the drive circuit 46 and the controller 42 are provided on the housing on which the motor 12 is provided. The drive circuit 46 and the controller 42 are provided, for example, on the same circuit substrate. The drive circuit 46 includes, for example, an inverter circuit. The drive circuit 46 controls the electric power supplied from the battery 38 to the motor 12. The drive circuit 46 is connected to the controller 42 by an electric wire or a wireless communication unit in a manner allowing for communication. The drive circuit 46 drives the motor 12 in response to a control signal from the controller 42.

The control device 40 can further be configured to control the motor 12 in accordance with a traveling speed V of the human-powered vehicle 10 and a rotational state of the crank axle 14A. Preferably, the human-powered vehicle 10 further includes a vehicle speed sensor 48, a crank rotation sensor 50, and a torque sensor 52. At least one of the vehicle speed sensor 48, the crank rotation sensor 50, and the torque sensor 52 can be included in the drive unit.

The vehicle speed sensor 48 is configured to output information related to the traveling speed V of the human-powered vehicle 10. The vehicle speed sensor 48 is, for example, configured to output a signal corresponding to a rotational speed of a wheel 16 of the human-powered vehicle 10. The vehicle speed sensor 48, for example, includes a magnetic sensor and is configured to detect a magnet provided on the wheel 16 of the human-powered vehicle 10. The magnetic sensor includes, for example, a magnetic reed that forms a reed switch or a Hall element. Preferably, the vehicle speed sensor 48 is configured to output a predetermined number of detection signals whenever the wheel 16 rotates once. The predetermined number is, for example, one. The controller 42 can calculate the traveling speed V of the human-powered vehicle 10 based on the rotational speed of the wheel 16. The vehicle speed sensor 48 can be mounted on a chainstay of the frame 20 of the human-powered vehicle 10 and configured to detect a magnet mounted on the rear wheel 16A. Alternatively, the vehicle speed sensor 48 can be provided on the front fork 32 and configured to detect a magnet mounted on the front wheel 16B. In the present embodiment, the vehicle speed sensor 48 is configured so that a reed switch detects a magnet whenever the wheel 16 rotates once. The vehicle speed sensor 48 can include, for example, an optical sensor or a global positioning system (GPS) receiver instead of the magnetic sensor. The vehicle speed sensor 48 can have any configuration as long as the vehicle speed sensor 48 is configured to output the information related to the vehicle speed of the human-powered vehicle 10. The vehicle speed sensor 48 is connected to the controller 42 by a wireless communication device or an electric cable.

The crank rotation sensor 50 is configured to output information related to the rotational state of the crank axle 14A. The crank rotation sensor 50 is, for example, mounted on the frame 20 of the human-powered vehicle 10 or the drive unit. The crank rotation sensor 50 includes a magnetic sensor that outputs a signal corresponding to the strength of the magnetic field. A ring-shaped magnet of which the magnetic field strength changes in a circumferential direction is provided on the crank axle 14A, a member that is rotated in cooperation with the crank axle 14A, or in the power transmission path extending from the crank axle 14A to the first rotational body 26. The member that is rotated in cooperation with the crank axle 14A includes an output shaft of the motor 12 or a member that forms a speed reducer. The crank rotation sensor 50 is configured to output a signal corresponding to at least one of a position of the crank axle 14A and a rotational angle of the crank 14. The crank rotation sensor 50 is further configured to output a signal corresponding to the rotational speed of the crank 14. The magnet detected by the crank rotation sensor 50 can be provided on a member that is rotated integrally with the crank axle 14A in the power transmission path of the human driving force H extending from the crank axle 14A to the first rotational body 26. For example, the magnet detected by the crank rotation sensor 50 can be provided on the first rotational body 26 in a case where the first one-way clutch is not provided between the crank axle 14A and the first rotational body 26. The crank rotation sensor 50 can include an optical sensor, an acceleration sensor, a torque sensor or the like, instead of the magnetic sensor. The crank rotation sensor 50 can have any configuration as long as the crank rotation sensor 50 is configured to output the information related to the rotational state of the crank 14. The crank rotation sensor 50 is connected to the controller 42 by a wireless communication device or an electric cable.

The torque sensor 52 is configured to output information corresponding to the human driving force H input to the crank 14. In a case where, for example, the first one-way clutch is provided in the power transmission path, the torque sensor 52 is provided at an upstream side of the first one-way clutch in the power transmission path. The torque sensor 52 includes a torsion sensor, a magnetostrictive sensor, a pressure sensor, and the like. The torsion sensor includes a torsion gauge. The torque sensor 52 is provided in the power transmission path or on a member included in the vicinity of a member included in the power transmission path. The member included in the power transmission path is, for example, the crank axle 14A, a member that transmits the human driving force H between the crank axle 14A and the first rotational body 26, the crank arms 14B, or the pedals 22. The torque sensor 52 is connected to the controller 42 by a wireless communication device or an electric cable. The torque sensor 52 can be replaced with another sensor as long as the sensor can output a signal corresponding to the human driving force H. The sensor configured to output a signal corresponding to the human driving force H includes, for example, a torsion sensor configured to detect the torsion of the frame 20, a torsion sensor configured to detect the torsion of the second rotational body 28 or the driving wheel 16A, or the like.

The controller 42 is configured to control the transmission 18 to change the transmission ratio R in accordance with a predetermined shifting condition. The predetermined shifting condition includes the travel state of the human-powered vehicle 10. Upon determining the predetermined shifting condition is satisfied, the controller 42 is configured to control the transmission 18 to change the transmission ratio R. For example, the predetermined shifting condition is satisfied upon determining a parameter PA related to the travel state of the human-powered vehicle 10 changes from inside a first range to outside the first range. The parameter PA includes, for example, at least one of a rotational speed N of the crank axle 14A and the human driving force H. Upon determining, for example, the parameter PA changes from inside the first range to outside the first range, the controller 42 is configured to control the transmission 18 so that the parameter PA is inside the first range.

In a case where the parameter PA includes the rotational speed N of the crank axle 14A, if the rotational speed N of the crank axle 14A increases from inside the first range to greater than an upper limit value of the first range, the controller 42 is configured to control the transmission 18 to increase the transmission ratio R. In a case where the rotational speed N of the crank axle 14A decreases from inside the first range to less than a lower limit value of the first range, the controller 42 is configured to control the transmission 18 to decrease the transmission ratio R.

In a case where the parameter PA includes the human driving force H, if the human driving force H increases from inside the first range to greater than the upper limit value of the first range, the controller 42 is configured to control the transmission 18 to decrease the transmission ratio R. In a case where the human driving force H decreases from inside the first range to less than the lower limit value of the first range, the controller 42 is configured to control the transmission 18 to increase the transmission ratio R.

The controller 42 can calculate the transmission ratio R by dividing the rotational speed of the wheel 16 detected by the vehicle speed sensor 48 by the rotational speed N of the crank axle 14A. The human-powered vehicle 10 can further include a shifting state detector 54. The shifting state detector 54 is, for example, configured to output a signal corresponding to a position of a movable portion of the transmission 18 to the controller 42. The shifting state detector 54 is connected to the controller 42 by a wireless communication device or an electric cable. The position of the movable portion of the transmission 18 corresponds to the transmission ratio R. The shifting state detector 54 can detect a rotational position of the motor 12 of the electric actuator 18A of the transmission 18 or a rotational position of a rotational member of a speed reducer that is linked to the motor 12.

The controller 42 can have any configuration as long as the controller 42 is configured to automatically change the transmission ratio R in accordance with the travel state of the human-powered vehicle 10. The predetermined shifting condition is not limited to a condition related to the rotational speed N of the crank axle 14A and a condition related to the human driving force H. The predetermined shifting condition can include, for example, a condition related to the traveling speed V of the human-powered vehicle 10. In a case where the predetermined shifting condition includes the condition related to the traveling speed V of the human-powered vehicle 10, the parameter PA related to the travel state of the human-powered vehicle 10 includes the traveling speed V of the human-powered vehicle 10. In this case, the controller 42 is, for example, configured to control the transmission 18 to increase the transmission ratio R as the parameter PA increases.

The controller 42 is, for example, configured to control the motor 12 so that assist force M generated by the motor 12 relative to the human driving force H becomes equal to a predetermined assist ratio X. The predetermined assist ratio X does not have to be constant. The predetermined assist ratio X can, for example, change in accordance with the human driving force H, the traveling speed V, or both of the human driving force H and the traveling speed V. The human driving force H and the assist force M can be expressed in torque or power. In a case where the human driving force H and the assist force M are expressed in torque, the human driving force H will be referred to as human torque TH, and the assist force M will be referred to as assist torque TM. In a case where the human driving force H and the assist force M are expressed in power, the human driving force H will be referred to as human force-based power WH, and the assist force M will be referred to as assist force-based power WM. The controller 42 can be, for example, configured to control the motor 12 so that the assist torque TM to the human torque TH becomes equal to the predetermined assist ratio X. The controller 42 can be, for example, configured to control the motor 12 so that the assist force-based power WM to the human force-based power WH becomes equal to the predetermined assist ratio X. The human force-based power WH is calculated by multiplying the human torque TH by the rotational speed N of the crank axle 14A. In a case where the output of the motor 12 is input to the power path of the human driving force H via a speed reducer, the output of the speed reducer corresponds to the assist force M. The controller 42 is configured to output a control instruction to the drive circuit 46 of the motor 12 in accordance with the human torque TH or the human force-based power WH. The control instruction includes, for example, a torque instruction value.

The controller 42 is configured to control the motor 12 so that an upper limit value MX of the assist force M becomes less than or equal to a predetermined value. In a case where the assist force M is expressed in torque, the controller 42 is, for example, configured to control the motor 12 so that the assist torque TM becomes equal to a predetermined value AT1. In a case where the assist force M is expressed in power, the controller 42 is, for example, configured to control the motor 12 so that the assist force-based power WM becomes less than or equal to a predetermined value WM1. The controller 42 can include a plurality of control modes. For example, at least one of the maximum value of the predetermined assist ratio X and the upper limit value MX varies between the control modes. The controller 42 is configured to control the motor 12 in one control mode selected from the control modes.

Preferably, the controller 42 is configured to control the motor 12 in accordance with at least one of the traveling speed V and the rotational state of the crank axle 14A. The controller 42 can be configured to stop the motor 12, for example, in a case where the traveling speed V becomes greater than or equal to a predetermined speed VA. The controller 42 can be configured to stop the motor 12, for example, in a case where the crank 14 stops. The controller 42 can be configured to control the motor 12 in accordance with a rotational amount of the crank 14, for example, in a case where the crank 14 starts rotating. The controller 42 can be configured to control the motor 12 to gradually increase the assist ratio X so that the assist ratio becomes equal to the predetermined assist ratio X, for example, in a case where the crank 14 starts rotating and the rotational amount of the crank 14 becomes equal to a predetermined rotational amount.

The controller 42 is configured to change an assist state A related to at least one of the assist ratio X of the assist force M generated by the motor 12 to predetermined human driving force H and the assist force M generated by the motor 12 in accordance with the human driving force H.

Preferably, the assist state A includes a first assist state A1 and a second assist state A2 having at least one of the maximum value of the assist ratio X and the upper limit value MX of the assist force M that is greater than that of the first assist state A1. Preferably, the controller 42 is configured to switch between the first assist state A1 and the second assist state A2 in accordance with the human driving force H. The controller 42 is configured to control the transmission 18 to maintain the transmission ratio R in a case where a parameter PB related to the human driving force H satisfies a predetermined condition. In one example, the predetermined condition includes a first example, a second example, a third example, a fourth example, a fifth example, a sixth example, a seventh example, and an eighth example.

The predetermined condition of the first example includes a case where a peak value HP of the human driving force H is greater than or equal to a first threshold value XA. In the predetermined condition of the first example, the parameter PB related to the human driving force H includes the peak value HP of the human driving force H. The predetermined condition of the first example is satisfied in a case where the peak value HP of the human driving force H is included in a range greater than or equal to the first threshold value XA. The first threshold value XA is, for example, the upper limit value of the peak value HP of the human driving force H allowing the transmission ratio R to be changed in a preferred manner. A specific example of a case where the transmission ratio R can be changed in a preferred manner is, for example, a case where a load applied to the linking member 30 is sufficiently small.

The predetermined condition of the second example includes a case where the peak value HP of the human driving force H is greater than or equal to the first threshold value XA. The predetermined condition of the second example further includes a case where the peak value HP of the human driving force H becomes greater than or equal to a second threshold value XB after the peak value HP of the human driving force H becomes greater than or equal to the first threshold value XA. In the predetermined condition of the second example, the parameter PB related to the human driving force H includes the peak value HP of the human driving force H. The predetermined condition of the second example is satisfied in a case where the peak value HP of the human driving force H is included in a range greater than or equal to the first threshold value XA. The predetermined condition of the second example is satisfied in a case where the peak value HP of the human driving force H is included in a range greater than or equal to the second threshold value XB that is less than the first threshold value XA after the peak value HP of the human driving force H becomes greater than or equal to the first threshold value XA. The second threshold value XB is, for example, the upper limit value of the peak value HP of the human driving force H allowing the transmission ratio R to be changed in a preferred manner.

The predetermined condition of the third example includes a case where the elapsed time is within a first time TA from a state in which the peak value HP of the human driving force H becomes included in a ranger greater than or equal to the first threshold value XA. In the predetermined condition of the third example, the parameter PB related to the human driving force H includes the peak value HP of the human driving force H. The predetermined condition of the third threshold value is satisfied over the first time TA from a state in which the peak value HP of the human driving force H becomes included in a range greater than or equal to the first threshold value XA. The first time TA is, for example, the expected time for the peak value HP of the human driving force H that becomes included in a range greater than or equal to the first threshold value XA to change to a range less than the first threshold value XA.

The predetermined condition of the fourth example includes a case where the peak value HP of the human driving force H is included in a range greater than or equal to the first threshold value XA successively for a predetermined first number of occurrences NA. In the predetermined condition of the fourth example, the parameter PB related to the human driving force H includes the peak value HP of the human driving force H and the number of occurrences in which the peak value HP of the human driving force H is detected. The predetermined condition of the fourth example is satisfied in a case where the peak value HP of the human driving force H is included in a range greater than or equal to the first threshold value XA successively for the predetermined first number of occurrences NA.

The predetermined condition of the fifth example includes a case where the peak value HP of the human driving force H is included in a range greater than or equal to the second threshold value XB after the peak value HP of the human driving force H is included in a range greater than or equal to the first threshold value XA successively for the predetermined first number of occurrences NA. The parameter PB related to the human driving force H in the fifth example includes the peak value HP of the human driving force H. The predetermined condition of the fifth example is satisfied in a case where the peak value HP of the human driving force H is included in a range greater than or equal to the second threshold value XB that is less than the first threshold value XA after the peak value HP of the human driving force H is included in a range greater than or equal to the first threshold value XA successively for the predetermined first number of occurrences NA.

The predetermined condition of the sixth example includes a case where the peak value HP of the human driving force H is included in a range less than the second threshold value XB for a predetermined second number of occurrences NB after the peak value HP of the human driving force H is included in a range greater than or equal to the first threshold value XA successively for the predetermined first number of occurrences NA. In the predetermined condition of the sixth example, the parameter PB related to the human driving force H includes the peak value HP of the human driving force H and the number of occurrences in which the peak value HP of the human driving force H is detected. The predetermined condition of the sixth example is satisfied in a case where the peak value HP of the human driving force H is included in a range less than the second threshold value XB for the predetermined second number of occurrences NB after the peak value HP of the human driving force H is included in a range greater than or equal to the first threshold value XA successively for the predetermined first number of occurrences NA.

The predetermined condition of the seventh example includes a case where the elapsed time is within a second time TB from a state in which the peak value HP of the human driving force H becomes included in a range greater than or equal to the first threshold value XA successively for the predetermined first number of occurrences NA. In the predetermined condition of the seventh example, the parameter PB related to the human driving force H includes the peak value HP of the human driving force H and the number of occurrences in which the peak value HP of the human driving force H is detected. The predetermined condition of the seventh example is satisfied for the second time TB from a state in which the peak value HP of the human driving force H becomes included in a range greater than or equal to the first threshold value XA successively for the predetermined first number of occurrences NA. The second time TB is, for example, the expected time for the peak value HP of the human driving force H that becomes included in a range greater than or equal to the first threshold value XA successively for the predetermined first number of occurrences NA to change to a range less than the first threshold value XA.

The predetermined condition of the eighth example includes a case where the peak value HP of the human driving force H is included in a range less than the second threshold value XB successively for the predetermined second number of occurrences NB after the peak value HP of the human driving force H becomes greater than or equal to the first threshold value XA. In the predetermined condition of the eighth example, the parameter PB related to the human driving force H further includes the number of occurrences in which the peak value HP of the human driving force H is detected. The predetermined condition of the eighth example is satisfied until the peak value HP of the human driving force H is included in a range less than the second threshold value XB successively for the predetermined second number of occurrences NB after the peak value HP of the human driving force H becomes greater than or equal to the first threshold value XA.

In the predetermined conditions of the first to eighth examples, the peak value HP of the human driving force H is the maximum value of the human driving force H during a single rotation of the crank 14. The peak value HP of the human driving force H can be the maximum value of the human driving force H during one-half of a single rotation of the crank 14. The peak value HP of the human driving force H is a peak value of the human torque TH.

In the predetermined conditions of the first to eighth examples, the first threshold value XA is, for example, a value in a range greater than or equal to 30 Nm and less than or equal to 60 Nm. The first threshold value XA can be, for example, 50 Nm. The first threshold value XA can be set by a user. The storage 44, for example, stores information related to the first threshold value XA. In the predetermined conditions of the second, fifth, sixth, and eighth examples, the second threshold value XB is, for example, a value in a range greater than or equal to 10 Nm and less than or equal to 40 Nm. The second threshold value XB can be, for example, 30 Nm. The second threshold value XB can be set by a user. The storage 44, for example, stores information related to the second threshold value XB.

In the predetermined conditions of the fourth to seventh examples, the first number of occurrences NA is, for example, a value in a range of two to ten or less. The first number of occurrences NA can be, for example, two or four. The first number of occurrences NA can be set by a user. The storage 44, for example, stores information related to the first number of occurrences NA.

In the predetermined conditions of the sixth and eighth examples, the predetermined second number of occurrences NB is, for example, a value in a range of two and ten. The predetermined second number of occurrences NB can be, for example, two or four. The predetermined second number of occurrences NB can be set by a user. The storage 44, for example, stores information related to the predetermined second number of occurrences NB.

In the predetermined condition of the third example, the first time TA is, for example, a range greater than or equal to ten seconds and less than or equal to ten minutes. The first time TA can be set by a user. The storage 44, for example, stores information related to the first time TA. In the predetermined condition of the seventh example, the second time TB is, for example, a range greater than or equal to ten seconds and less than or equal to ten minutes. The predetermined second time TB can be set by a user. The storage 44, for example, stores information related to the predetermined second time TB.

Preferably, the control device 40 includes an interface 41. The interface 41 can be, for example, configured to connect to a display and an operation unit mounted on the human-powered vehicle 10. The interface 41 can include a wireless communication device capable of communicating with an external device and a wired communication device capable of communicating with an external device via an electric cable. The external device includes, for example, a smartphone, a tablet computer, a personal computer, and the like. The wireless communication device is configured to perform communication, for example, through a short-range wireless communication system such as ANT+® and Bluetooth®. The controller 42 can be configured to show at least one of the information related to the first threshold value XA, the information related to the second threshold value XB, the information related to the first number of occurrences NA, the information related to the predetermined second number of occurrences NB, the information related to the first time TA, and the information related to the second time TB on the display. The controller 42 can be configured to change at least one of the information related to the first threshold value XA, the information related to the second threshold value XB, the information related to the first number of occurrences NA, the information related to the predetermined second number of occurrences NB, the information related to the first time TA, and the information related to the second time TB and store the changed information in the storage 44 in accordance with an operation of the operation unit. The controller 42 can be configured to change at least one of the information related to the first threshold value XA, the information related to the second threshold value XB, the information related to the first number of occurrences NA, the information related to the predetermined second number of occurrences NB, the information related to the first time TA, and the information related to the second time TB in response to an instruction transmitted from an external device and store the changed information in the storage 44.

The controller 42 is configured to change the assist state A from the first assist state A1 to the second assist state A2 in a case where the parameter PB related to the human driving force H satisfies the predetermined condition.

One example of a control process executed by the controller 42 in accordance with the predetermined condition of the second example will now be described with reference to FIG. 3. In a case where electric power is supplied to the controller 42, the controller 42 starts the process from step S11 of the flowchart shown in FIG. 3. In a case where the process of the flowchart in FIG. 3 ends, the controller 42 repeats the process from step S11 in predetermined cycles until the supply of electric power ends.

In step S11, the controller 42 determines whether the predetermined shifting condition is satisfied. In the step S11, in a case where the controller 42 determines that the predetermined shifting condition is not satisfied, that is, for example, in a case where the parameter PA related to the travel state of the human-powered vehicle 10 is included in the first range, the controller 42 ends the process. In step S11, in a case where the controller 42 determines that the predetermined shifting condition is satisfied, that is, for example, in a case where the parameter PA related to the travel state of the human-powered vehicle 10 has changed from inside the first range to outside the first range and the transmission ratio R can be changed, the controller 42 proceeds to step S12. In step S11, for example, if the present transmission ratio R is maximal, the controller 42 determines that the shifting condition is not satisfied and then ends the process even in a case where the transmission ratio R needs to be increased in accordance with the shifting condition because the transmission ratio R cannot be changed. In step S11, for example, if the present transmission ratio R is minimal, the controller 42 determines that the shifting condition is not satisfied and then ends the process even in a case where the transmission ratio R needs to be decreased in accordance with the shifting condition because the transmission ratio R cannot be changed.

In step S12, the controller 42 obtains the information related to the peak value HP of the human driving force H from the torque sensor 52 and then proceeds to step S13. The controller 42 can obtain the maximum value of the human driving force H during a single rotation of the crank 14 or the maximum value of the human driving force H during one-half of a single rotation of the crank 14 from the output of the torque sensor 52 and the output of the crank rotation sensor 50. In step S13, the controller 42 determines whether the peak value HP of the human driving force H is included in a range greater than or equal to the first threshold value XA. In step S13, in a case where the controller 42 determines that the peak value HP of the human driving force H is not included in a range greater than or equal to the first threshold value XA, the controller 42 proceeds to step S19.

In step S19, the controller 42 determines whether the assist state A is the second assist state A2. In step S19, in a case where the controller 42 determines that the assist state A is not the second assist state A2, the controller 42 proceeds to step S14. In step S19, in a case where the controller 42 determines that the assist state A is the second assist state A2, the controller 42 proceeds to step S20. In step S20, the controller 42 controls the motor 12 so that the assist state A is changed from the second assist state A2 to the first assist state A1. Then, the controller 42 proceeds to step S14. In step S14, the controller 42 changes the transmission ratio R in accordance with the predetermined shifting condition and then ends the process. In step S13, in a case where the controller 42 determines that the peak value HP of the human driving force H is included in a range greater than or equal to the first threshold value XA, the controller 42 proceeds to step S15.

In step S15, the controller 42 determines whether the peak value HP of the human driving force H is included in a range greater than or equal to the second threshold value XB. In step S15, in a case where the controller 42 determines that the peak value HP of the human driving force H is not included in a range greater than or equal to the second threshold value XB, the controller 42 proceeds to step S19. In step S15, in a case where the controller 42 determines that the peak value HP of the human driving force H is included in a range greater than or equal to the second threshold value XB, the controller 42 proceeds to step S16.

In step S16, the controller 42 controls the transmission 18 to maintain the transmission ratio R and then proceeds to step S18. In step S18, the controller 42 determines whether the assist state A is the first assist state A1. In step S18, in a case where the controller 42 determines that the assist state A is the first assist state A1, the controller 42 proceeds to step S17. In step S17, the controller 42 controls the motor 12 so that the assist state A is changed from the first assist state A1 to the second assist state A2. Then, the controller 42 ends the process. The control process executed by the controller 42 in accordance with the predetermined condition of the first example corresponds to, for example, a process in which step S15 is omitted from the flowchart shown in FIG. 3. If step S15 is omitted from the flowchart shown in FIG. 3, in a case where the controller 42 determines that the peak value HP of the human driving force H is included in a range greater than or equal to the first threshold value XA in step S13, the controller 42 proceeds to step S16. The control device 40 configured to control the transmission 18 and the motor 12 in accordance with the predetermined condition of the first example or the predetermined condition of the second example restricts changing of the transmission ratio R in a case where the human driving force H is large. This avoids failures that can be caused in a case where a large load is applied to the transmission 18 during shifting by the transmission 18. The control device 40 configured to control the transmission 18 and the motor 12 in accordance with the predetermined condition of the second example restricts changing of the transmission ratio R even in a case where the peak value HP of the human driving force H becomes less than the first threshold value XA immediately after the peak value HP of the human driving force H becomes greater than or equal to the first threshold value XA. This avoids failures that can be caused in a case where a large load is applied to the transmission 18 during shifting by the transmission 18.

Figure 4:
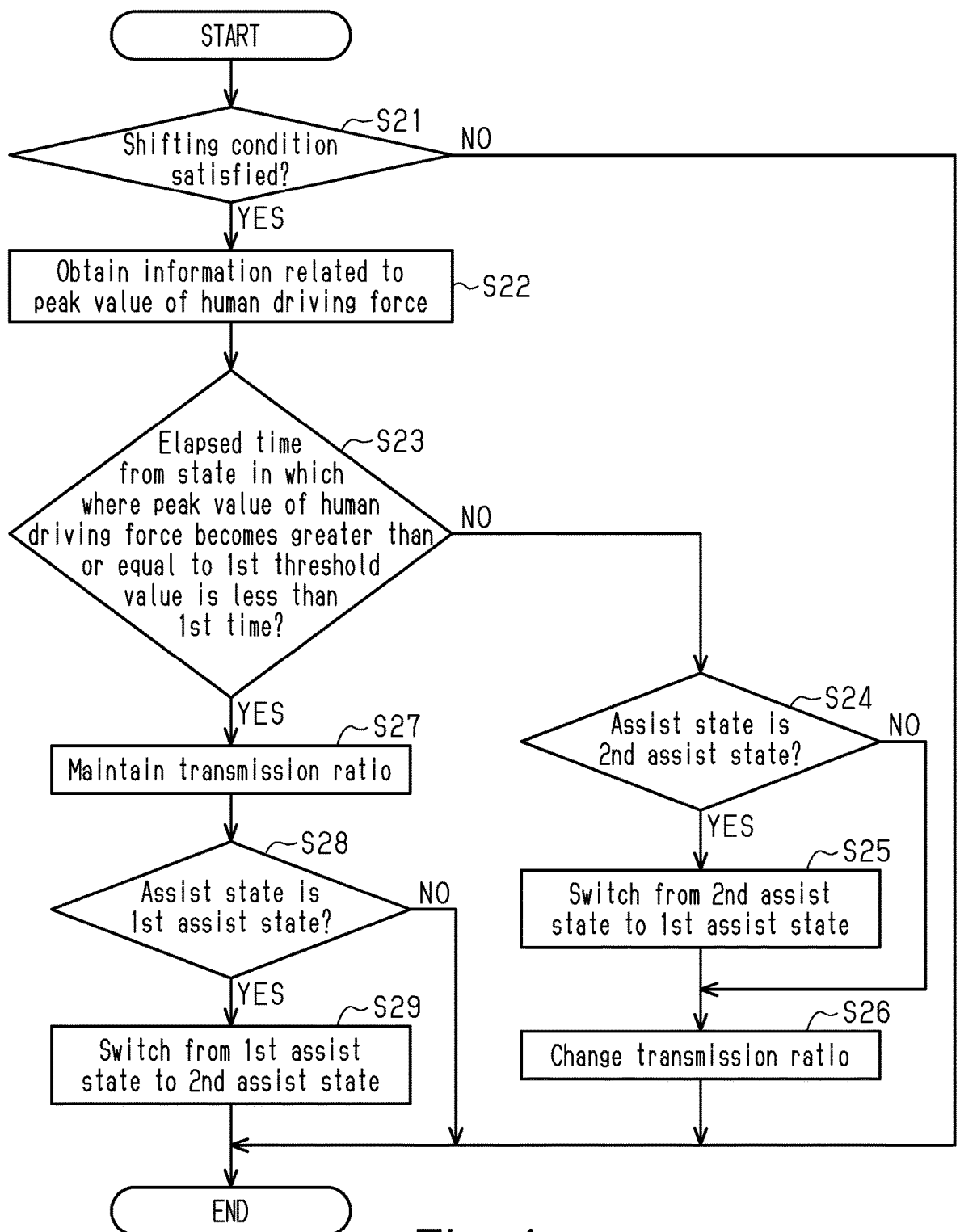
FIG. 4 is a flowchart illustrating one example of the control process executed by the electronic controller in accordance with a predetermined condition of a third example.

One example of a control process executed by the controller 42 in accordance with the predetermined condition of the third example will now be described with reference to FIG. 4. In a case where electric power is supplied to the controller 42, the controller 42 starts the process from step S21 of the flowchart shown in FIG. 4. In a case where the process of the flowchart in FIG. 4 ends, the controller 42 repeats the process from step S21 in predetermined cycles until the supply of electric power ends.

Figure 3:
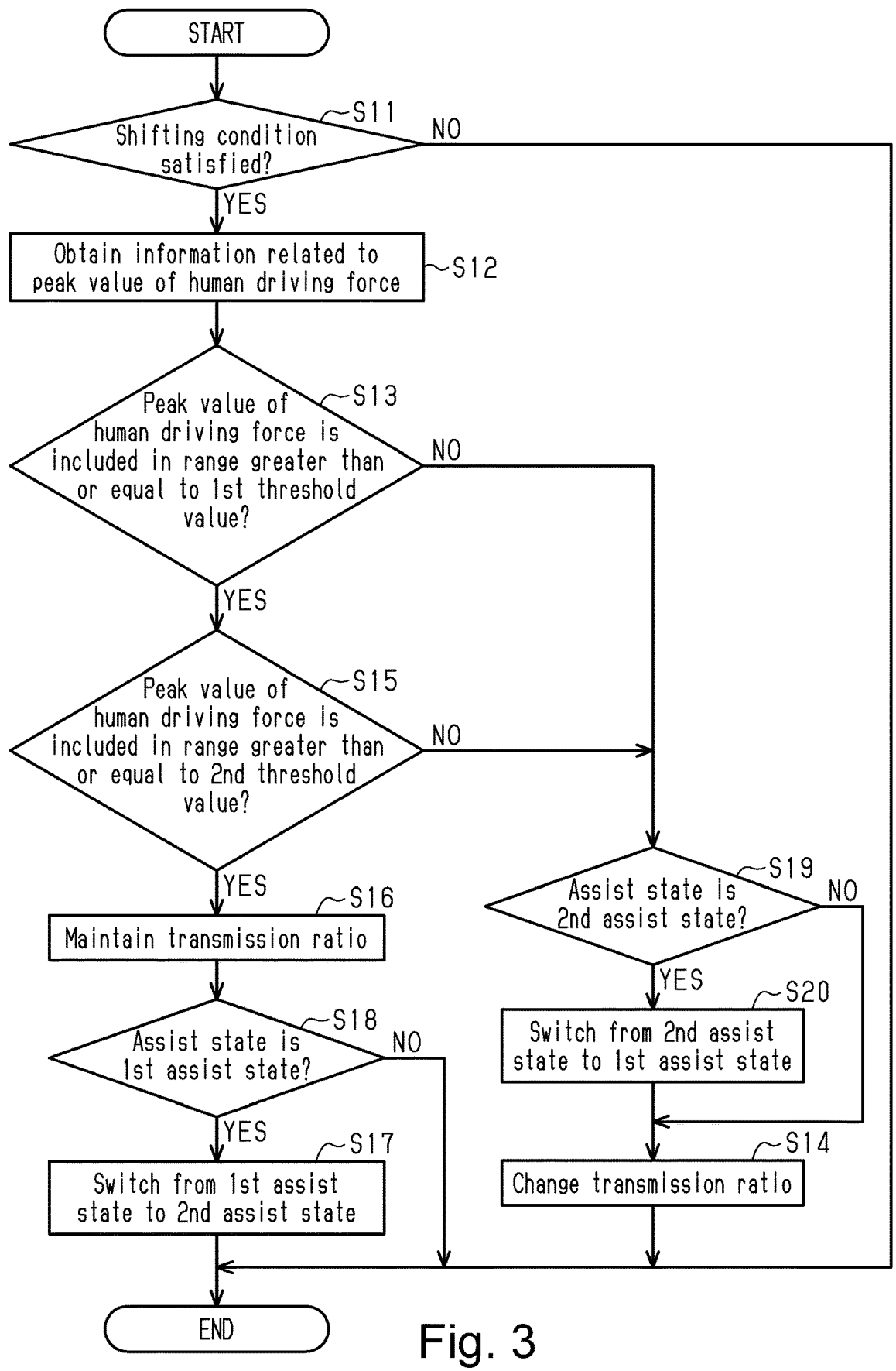
FIG. 3 is a flowchart illustrating one example of a control process executed by an electronic controller in accordance with a predetermined condition of a second example.

In step S21, the controller 42 executes the same process as step S11 shown in FIG. 3. In step S21, in a case where controller 42 determines that the predetermined shifting condition is not satisfied, the controller 42 ends the process. In step S21, in a case where the controller 42 determines that the predetermined shifting condition is satisfied, the controller 42 proceeds to step S22.

In step S22, the controller 42 obtains the information related to the peak value HP of the human driving force H from the torque sensor 52 and then proceeds to step S23. In step S23, the controller 42 determines whether the elapsed time from a state in which the peak value HP of the human driving force H becomes greater than or equal to the first threshold value XA is less than the first time TA. In step S23, in a case where the controller 42 determines that the elapsed time from a state in which the peak value HP of the human driving force H becomes greater than or equal to the first threshold value XA is not less than the first time TA, the controller 42 proceeds to step S24. For example, in step S23, in a case where the peak value HP of the human driving force H is not greater than or equal to the first threshold value XA, the controller 42 determines that the elapsed time from a state in which the peak value HP of the human driving force H becomes greater than or equal to the first threshold value XA is not less than the first time TA.

In step S24, the controller 42 determines whether the assist state A is the second assist state A2. In step S24, in a case where the controller 42 determines that the assist state A is not the second assist state A2, the controller 42 proceeds to step S26. In step S24, in a case where the controller 42 determines that the assist state A is the second assist state A2, the controller 42 proceeds to step S25. In step S25, the controller 42 controls the motor 12 so that the assist state A is changed from the second assist state A2 to the first assist state A1. Then, the controller 42 proceeds to step S26. In step S26, the controller 42 changes the transmission ratio R in accordance with the predetermined shifting condition and then ends the process. In step S23, in a case where the controller 42 determines that the elapsed time from a state in which the peak value HP of the human driving force H becomes greater than or equal to the first threshold value XA is less than the first time TA, the controller 42 proceeds to step S27.

In step S27, the controller 42 controls the transmission 18 to maintain the transmission ratio R and then proceeds to step S28. In step S28, the controller 42 determines whether the assist state A is the first assist state A1. In step S28, in a case where the controller 42 determines that the assist state A is the first assist state A1, the controller 42 proceeds to step S29. In step S29, the controller 42 controls the motor 12 so that the assist state A is changed from the first assist state A1 to the second assist state A2. Then, the controller 42 ends the process. The control device 40 configured to control the transmission 18 and the motor 12 in accordance with the predetermined condition of the third example restricts changing of the transmission ratio R even in a case where the peak value of the human driving force H becomes less than the first threshold value XA immediately after the peak value HP of the human driving force H becomes greater than or equal to the first threshold value XA. This avoids failures that can be caused in a case where a large load is applied to the transmission 18 during shifting by the transmission 18.

Figure 5:
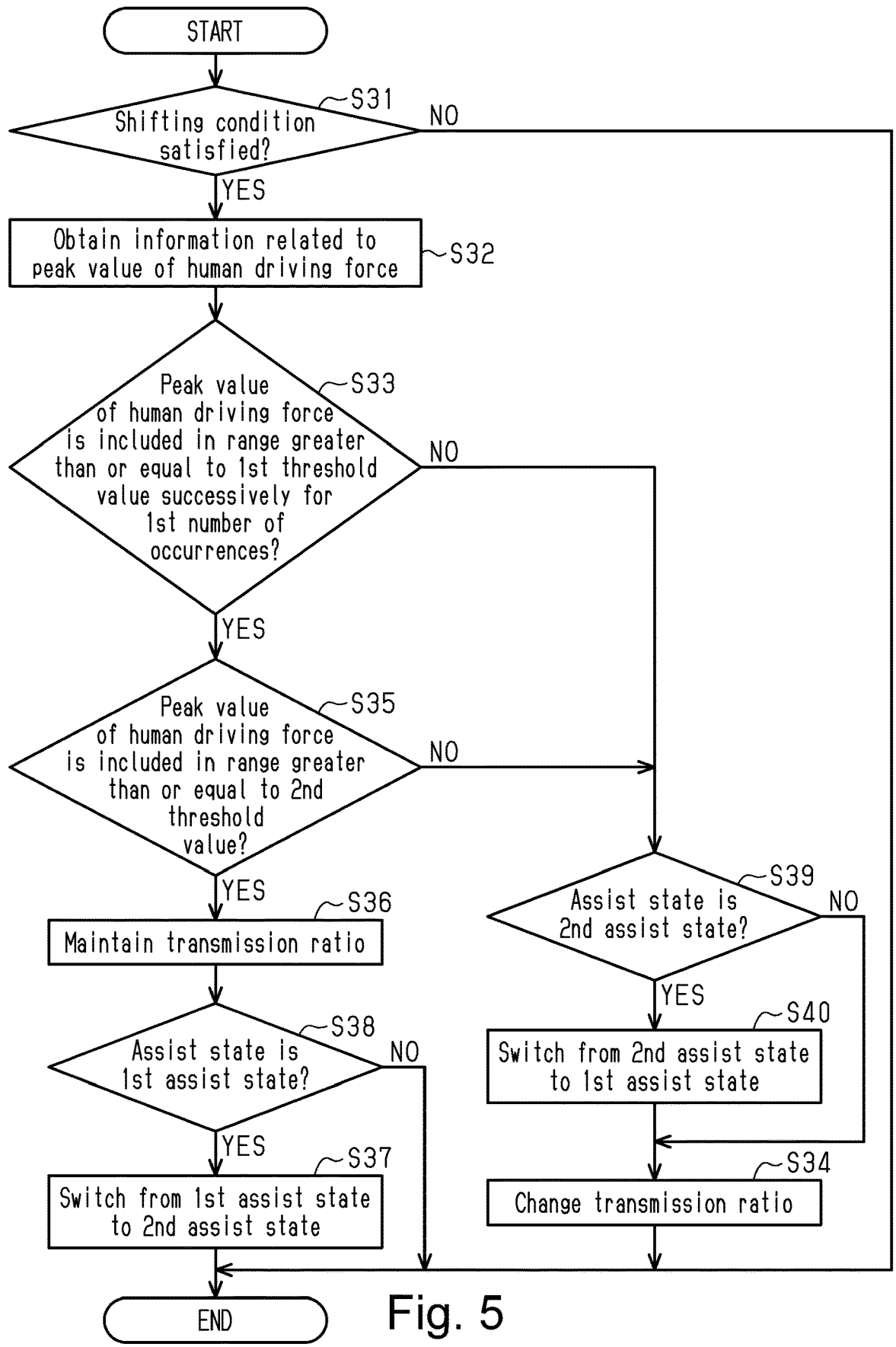
FIG. 5 is a flowchart illustrating one example of the control process executed by the electronic controller in accordance with a predetermined condition of a fifth example.

One example of a control process executed by the controller 42 in accordance with the predetermined condition of the fifth example will now be described with reference to FIG. 5. In a case where electric power is supplied to the controller 42, the controller 42 starts the process from step S31 of the flowchart shown in FIG. 5. In a case where the process of the flowchart in FIG. 5 ends, the controller 42 repeats the process from step S31 in predetermined cycles until the supply of electric power ends.

In step S31, the controller 42 executes the same process as step S11 shown in FIG. 3. In step S31, in a case where the controller 42 determines that the predetermined shifting condition is not satisfied, the controller 42 ends the process. In step S31, in a case where the controller 42 determines that the predetermined shifting condition is satisfied, the controller 42 proceeds to step S32.

In step S32, the controller 42 obtains the information related to the peak value HP of the human driving force H from the torque sensor 52 and then proceeds to step S33. In step S33, the controller 42 determines whether the peak value HP of the human driving force H is included in a range greater than or equal to the first threshold value XA successively for the predetermined first number of occurrences NA. The controller 42 is can obtain the maximum value of the human driving force H during a single rotation of the crank 14 or the maximum value of the human driving force H during one-half of a single rotation of the crank 14 from the output of the torque sensor 52 and the output of the crank rotation sensor 50. In step S33, in a case where the controller 42 determines that the peak value HP of the human driving force H is not included in a range greater than or equal to the first threshold value XA successively for the predetermined first number of occurrences NA, the controller 42 proceeds to step S39.

In step S39, the controller 42 determines whether the assist state A is the second assist state A2. In step S39, in a case where the controller 42 determines that the assist state A is not the second assist state A2, the controller 42 proceeds to step S34. In step S39, in a case where the controller 42 determines that the assist state A is the second assist state A2, the controller 42 proceeds to step S40. In step S40, the controller 42 controls the motor 12 so that the assist state A is changed from the second assist state A2 to the first assist state A1. Then, the controller 42 proceeds to step S34. In step S34, the controller 42 changes the transmission ratio R in accordance with the predetermined shifting condition and then ends the process. In step S33, in a case where the controller 42 determines that the peak value HP of the human driving force H is included in a range greater than or equal to the first threshold value XA successively for the predetermined first number of occurrences NA, the controller 42 proceeds to step S35.

In step S35, the controller 42 determines whether the peak value HP of the human driving force H is included in a range greater than or equal to the second threshold value XB. In step S35, in a case where the controller 42 determines that the peak value HP of the human driving force H is not included in a range greater than or equal to the second threshold value XB, the controller 42 proceeds to step S39. In step S35, in a case where the controller 42 determines that the peak value HP of the human driving force H is included in a range greater than or equal to the second threshold value XB, the controller 42 proceeds to step S36.

In step S36, the controller 42 controls the transmission 18 to maintain the transmission ratio R and then proceeds to step S38. In step S38, the controller 42 determines whether the assist state A is the first assist state A1. In step S38, in a case where the controller 42 determines that the assist state A is the first assist state A1, the controller 42 proceeds to step S37. In step S37, the controller 42 controls the motor 12 so that the assist state A is changed from the first assist state A1 to the second assist state A2. Then, the controller 42 ends the process. The control process executed by the controller 42 in accordance with the predetermined condition of the fourth example corresponds to, for example, a process in which step S35 is omitted from the flowchart shown in FIG. 5. If step S35 is omitted from the flowchart shown in FIG. 5, in a case where the controller 42 determines that the peak value HP of the human driving force H is included in a range greater than or equal to the first threshold value XA successively for the predetermined first number of occurrences NA in step S33, the controller 42 proceeds to step S36. The control device 40 configured to control the transmission 18 and the motor 12 in accordance with the predetermined condition of the fourth example or the predetermined condition of the fifth example allows the transmission 18 to be controlled differently between a case where the human driving force H momentarily becomes large and a case where the human driving force H continuously increases. The control device 40 configured to control the transmission 18 and the motor 12 in accordance with the predetermined condition of the fifth example restricts changing of the transmission ratio R even in a case where the peak value HP of the human driving force H becomes less than the first threshold value XA. This avoids failures that can be caused in a case where a large load is applied to the transmission 18 during shifting by the transmission 18.

Figure 6:
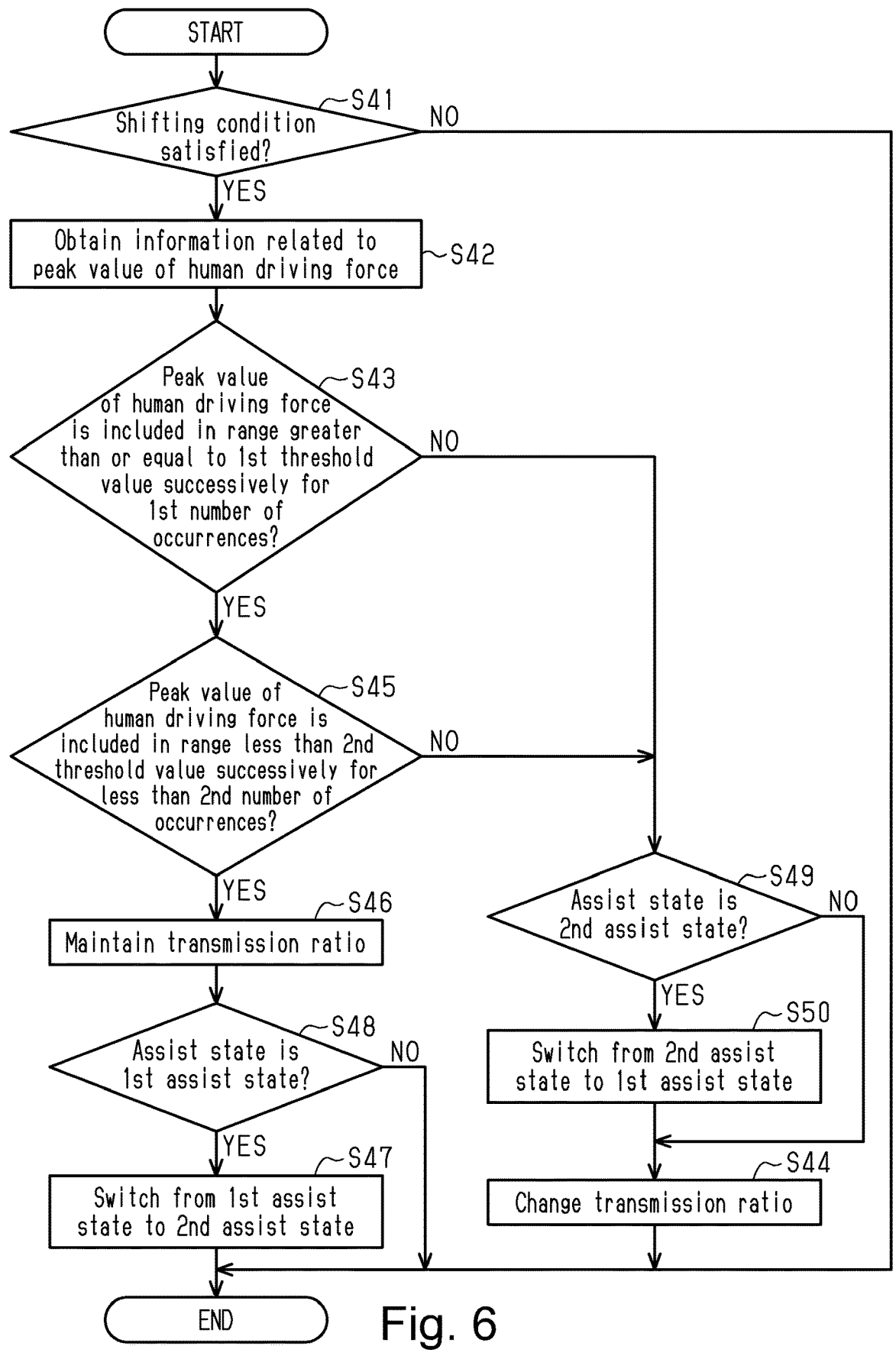
FIG. 6 is a flowchart illustrating one example of the control process executed by the electronic controller in accordance with a predetermined condition of a sixth example.

One example of a control process executed by the controller 42 in accordance with the predetermined condition of the sixth example will now be described with reference to FIG. 6. In a case where electric power is supplied to the controller 42, the controller 42 starts the process from step S41 of the flowchart shown in FIG. 6. In a case where the process of the flowchart in FIG. 6 ends, the controller 42 repeats the process from step S41 in predetermined cycles until the supply of electric power ends.

In step S41, the controller 42 executes the same process as step S11 shown in FIG. 3. In step S41, in a case where the controller 42 determines that the predetermined shifting condition is not satisfied, the controller 42 ends the process. In step S41, in a case where the controller 42 determines that the predetermined shifting condition is satisfied, the controller 42 proceeds to step S42.

In step S42, the controller 42 obtains the information related to the peak value HP of the human driving force H from the torque sensor 52 and then proceeds to step S43. In step S43, the controller 42 determines whether the peak value HP of the human driving force H is included in a range greater than or equal to the first threshold value XA successively for the predetermined first number of occurrences NA. The controller 42 is can obtain the maximum value of the human driving force H during a single rotation of the crank or the maximum value of the human driving force H during one-half of a single rotation of the crank 14 from the output of the torque sensor 52 and the output of the crank rotation sensor 50. In step S43, in a case where the controller 42 determines that the peak value HP of the human driving force H is not included in a range greater than or equal to the first threshold value XA successively for the predetermined first number of occurrences NA, the controller 42 proceeds to step S49.

In step S49, the controller 42 determines whether the assist state A is the second assist state A2. In step S49, in a case where the controller 42 determines that the assist state A is not the second assist state A2, the controller 42 proceeds to step S44. In step S49, in a case where the controller 42 determines that the assist state A is the second assist state A2, the controller 42 proceeds to step S50. In step S50, the controller 42 controls the motor 12 so that the assist state A is changed from the second assist state A2 to the first assist state A1. Then, the controller 42 proceeds to step S44. In step S44, the controller 42 changes the transmission ratio R in accordance with the predetermined shifting condition and then ends the process. In step S43, in a case where the controller 42 determines that the peak value HP of the human driving force H is included in a range greater than or equal to the first threshold value XA successively for the predetermined first number of occurrences NA, the controller 42 proceeds to step S45.

In step S45, the controller 42 determines whether the peak value HP of the human driving force H is included in a range less than the second threshold value XB successively for less than the predetermined second number of occurrences NB. In step S45, in a case where the controller 42 determines that the peak value HP of the human driving force H is included in a range less than the second threshold value XB successively for the predetermined second number of occurrences NB or greater, the controller 42 proceeds to step S49. In step S45, in a case where the controller 42 determines whether the peak value HP of the human driving force H is included in a range less than the second threshold value XB successively for less than the predetermined second number of occurrences NB, the controller 42 proceeds to step S46.

In step S46, the controller 42 controls the transmission 18 to maintain the transmission ratio R and then proceeds to step S48. In step S48, the controller 42 determines whether the assist state A is the first assist state A1. In step S48, in a case where the controller 42 determines that the assist state A is the first assist state A1, the controller 42 proceeds to step S47. In step S47, the controller 42 controls the motor 12 so that the assist state A is changed from the first assist state A1 to the second assist state A2. Then, the controller 42 ends the process. The control device 40 configured to control the transmission 18 and the motor 12 in accordance with the predetermined condition of the sixth example allows the transmission 18 to be controlled differently between a case where the human driving force H momentarily becomes large and a case where the human driving force H continuously increases. The control device 40 configured to control the transmission 18 and the motor 12 in accordance with the predetermined condition of the sixth example restricts changing of the transmission ratio R even in a case where the peak value HP of the human driving force H becomes less than the first threshold value XA. This avoids failures that can be caused in a case where a large load is applied to the transmission 18 during shifting by the transmission 18.

Figure 7:
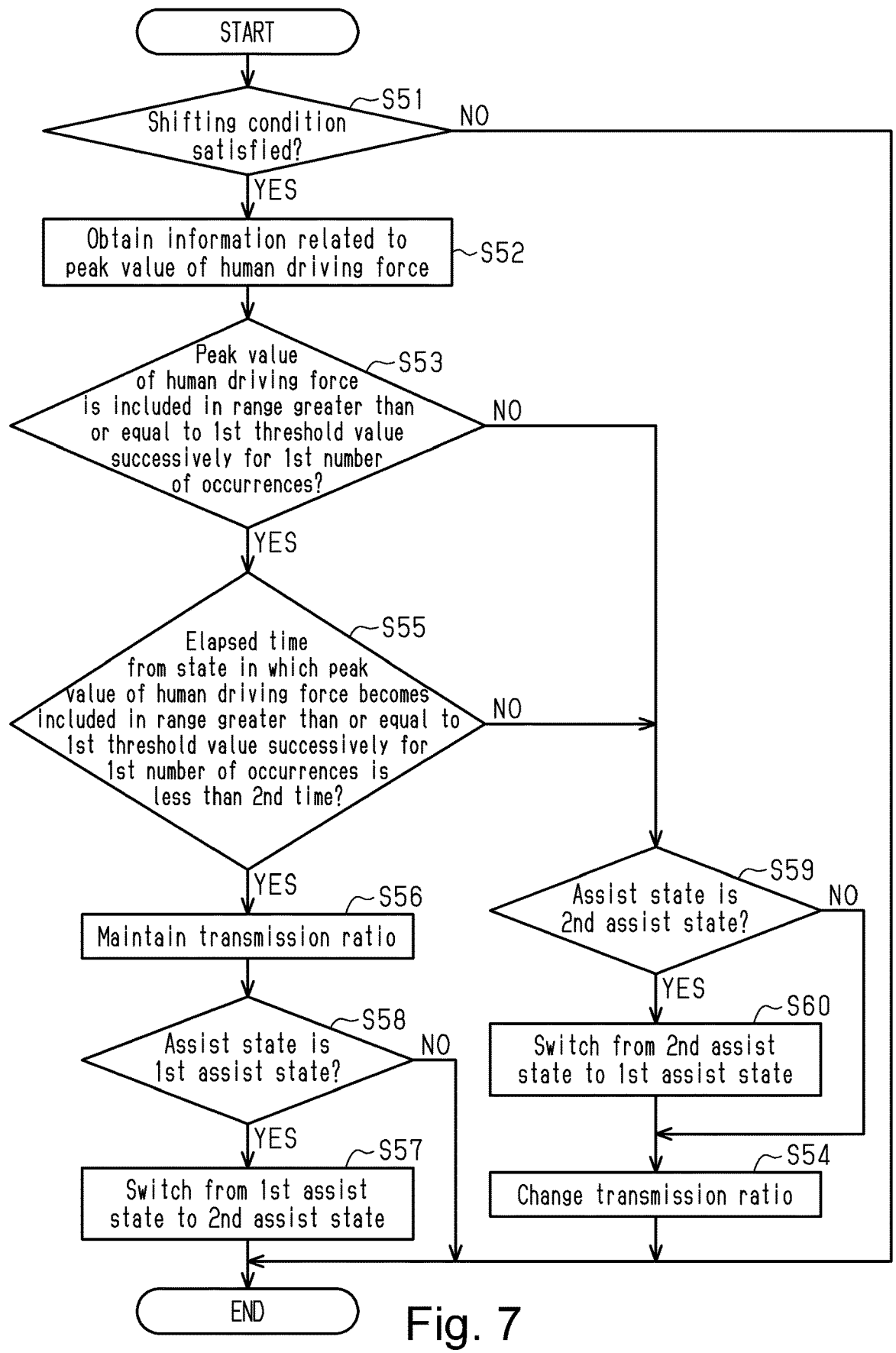
FIG. 7 is a flowchart illustrating one example of the control process executed by the electronic controller in accordance with a predetermined condition of a seventh example.

One example of a control process executed by the controller 42 in accordance with the predetermined condition of the seventh example will now be described with reference to FIG. 7. In a case where electric power is supplied to the controller 42, the controller 42 starts the process from step S51 of the flowchart shown in FIG. 7. In a case where the process of the flowchart in FIG. 7 ends, the controller 42 repeats the process from step S51 in predetermined cycles until the supply of electric power ends.

In step S51, the controller 42 executes the same process as step S11 shown in FIG. 3. In step S51, in a case where the controller 42 determines that the predetermined shifting condition is not satisfied, the controller 42 ends the process. In step S51, in a case where the controller 42 determines that the predetermined shifting condition is satisfied, the controller 42 proceeds to step S52.

In step S52, the controller 42 obtains the information related to the peak value HP of the human driving force H from the torque sensor 52 and then proceeds to step S53. In step S53, the controller 42 determines whether the peak value HP of the human driving force H is included in a range greater than or equal to the first threshold value XA successively for the predetermined first number of occurrences NA. The controller 42 is can obtain the maximum value of the human driving force H during a single rotation of the crank or the maximum value of the human driving force H during one-half of a single rotation of the crank 14 from the output of the torque sensor 52 and the output of the crank rotation sensor 50. In step S53, in a case where the controller 42 determines that the peak value HP of the human driving force H is not included in a range greater than or equal to the first threshold value XA successively for the predetermined first number of occurrences NA, the controller 42 proceeds to step S59.

In step S59, the controller 42 determines whether the assist state A is the second assist state A2. In step S59, in a case where the controller 42 determines that the assist state A is not the second assist state A2, the controller 42 proceeds to step S54. In step S59, in a case where the controller 42 determines that the assist state A is the second assist state A2, the controller 42 proceeds to step S60. In step S60, the controller 42 controls the motor 12 so that the assist state A is changed from the second assist state A2 to the first assist state A1. Then, the controller 42 proceeds to step S54. In step S54, the controller 42 changes the transmission ratio R in accordance with the predetermined shifting condition and then ends the process. In step S53, in a case where the controller 42 determines that the peak value HP of the human driving force H is included in a range greater than or equal to the first threshold value XA successively for the predetermined first number of occurrences NA, the controller 42 proceeds to step S55.

In step S55, the controller 42 determines whether the elapsed time from a state in which the peak value HP of the human driving force H becomes included in a range greater than or equal to the first threshold value XA successively for the predetermined first number of occurrences NA is less than the second time TB. In step S55, in a case where the controller 42 determines that the elapsed time from a state in which the peak value HP of the human driving force H becomes included in a range greater than or equal to the first threshold value XA successively for the predetermined first number of occurrences NA is greater than or equal to the second time TB, the controller 42 proceeds to step S59. In step S55, in a case where the controller 42 determines that the elapsed time from a state in which the peak value HP of the human driving force H becomes included in a range greater than or equal to the first threshold value XA successively for the predetermined first number of occurrences NA is less than the second time TB, the controller 42 proceeds to step S56.

In step S56, the controller 42 controls the transmission 18 to maintain the transmission ratio R and then proceeds to step S58. In step S58, the controller 42 determines whether the assist state A is the first assist state A1. In step S58, in a case where the controller 42 determines that the assist state A is the first assist state A1, the controller 42 proceeds to step S57. In step S57, the controller 42 controls the motor 12 so that the assist state A is changed from the first assist state A1 to the second assist state A2. Then, the controller 42 ends the process. The control device 40 configured to control the transmission 18 and the motor 12 in accordance with the predetermined condition of the seventh example or the predetermined condition of the fifth example allows the transmission 18 to be controlled differently between a case where the human driving force H momentarily becomes large and a case where the human driving force H continuously increases. The control device 40 configured to control the transmission 18 and the motor 12 in accordance with the predetermined condition of the seventh example restricts changing of the transmission ratio R even in a case where the peak value HP of the human driving force H becomes less than the first threshold value XA immediately after the peak value HP of the human driving force H becomes greater than or equal to the first threshold value XA. This avoids failures that can be caused in a case where a large load is applied to the transmission 18 during shifting by the transmission 18.

Figure 8:
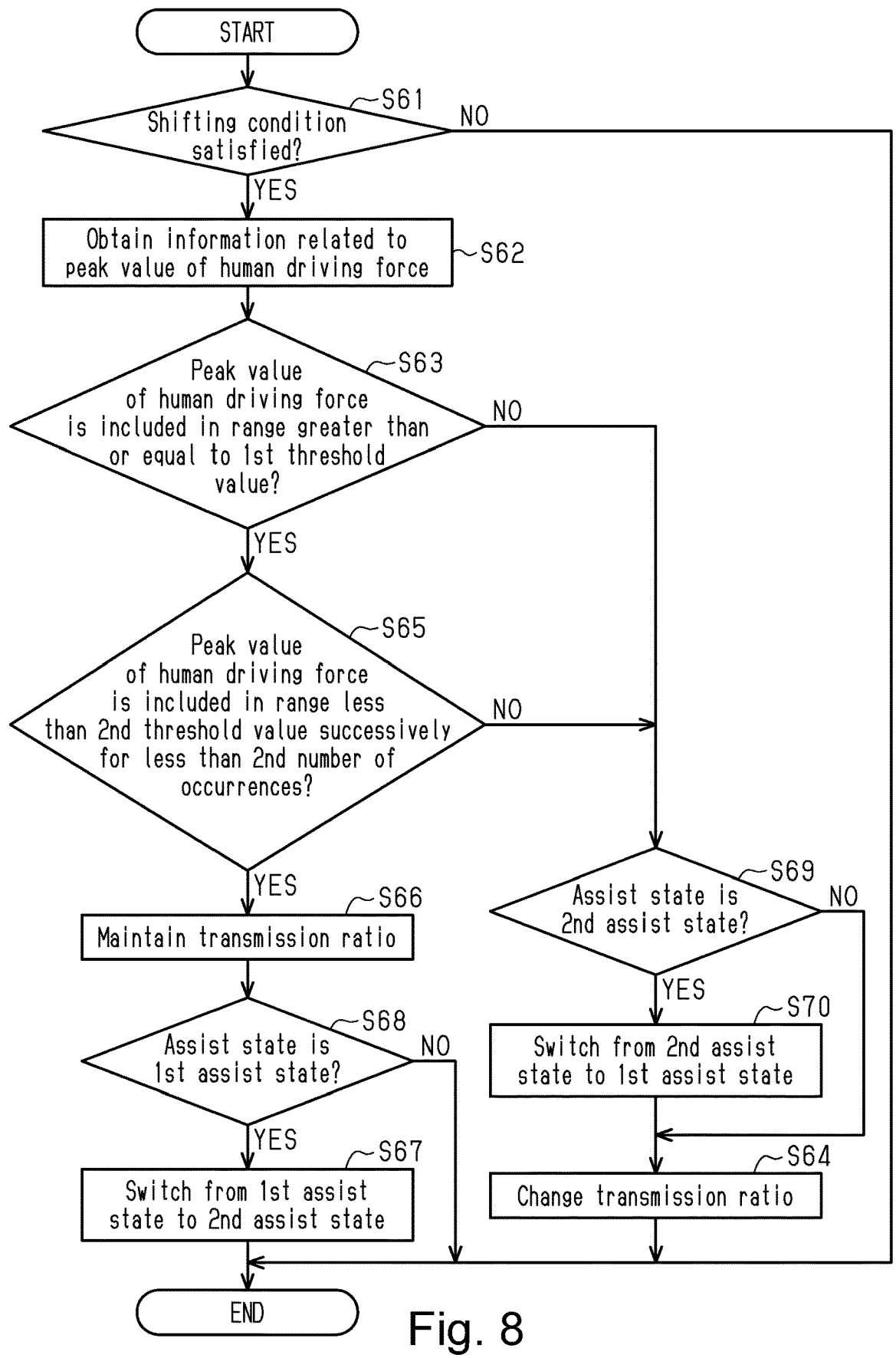
FIG. 8 is a flowchart illustrating one example of the control process executed by the electronic controller in accordance with a predetermined condition of an eighth example.

One example of a control process executed by the controller 42 in accordance with the predetermined condition of the eighth example will now be described with reference to FIG. 8. In a case where electric power is supplied to the controller 42, the controller 42 starts the process from step S61 of the flowchart shown in FIG. 8. In a case where the process of the flowchart in FIG. 8 ends, the controller 42 repeats the process from step S61 in predetermined cycles until the supply of electric power ends.

In step S61, the controller 42 executes the same process as step S11 shown in FIG. 3. In step S61, in a case where the controller 42 determines that the predetermined shifting condition is not satisfied, the controller 42 ends the process. In step S61, in a case where the controller 42 determines that the predetermined shifting condition is satisfied, the controller 42 proceeds to step S62.

In step S62, the controller 42 obtains the information related to the peak value HP of the human driving force H from the torque sensor 52 and then proceeds to step S63. The controller 42 is can obtain the maximum value of the human driving force H during a single rotation of the crank or the maximum value of the human driving force H during one-half of a single rotation of the crank 14 from the output of the torque sensor 52 and the output of the crank rotation sensor 50. In step S63, the controller 42 determines whether the peak value HP of the human driving force H is included in a range greater than or equal to the first threshold value XA. In step S63, in a case where the controller 42 determines that the peak value HP of the human driving force H is not included in a range less than the first threshold value XA, the controller 42 proceeds to step S69.

In step S69, the controller 42 determines whether the assist state A is the second assist state A2. In step S69, in a case where the controller 42 determines that the assist state A is not the second assist state A2, the controller 42 proceeds to step S64. In step S69, in a case where the controller 42 determines that the assist state A is the second assist state A2, the controller 42 proceeds to step S70. In step S70, the controller 42 controls the motor 12 so that the assist state A is changed from the second assist state A2 to the first assist state A1. Then, the controller 42 proceeds to step S64. In step S64, the controller 42 changes the transmission ratio R in accordance with the predetermined shifting condition and then ends the process. In step S63, in a case where the controller 42 determines that the peak value HP of the human driving force H is included in a range greater than or equal to the first threshold value XA, the controller 42 proceeds to step S65.

In step S65, the controller 42 determines whether the peak value HP of the human driving force H is included in a range less than the second threshold value XB successively for less than the predetermined second number of occurrences NB. In step S65, in a case where the controller 42 determines that the peak value HP of the human driving force H is included in a range less than the second threshold value XB successively for the predetermined second number of occurrences NB or greater, the controller 42 proceeds to step S69. In step S65, in a case where the controller 42 determines whether the peak value HP of the human driving force H is included in a range less than the second threshold value XB successively for less than the predetermined second number of occurrences NB, the controller 42 proceeds to step S66.

In step S66, the controller 42 controls the transmission 18 to maintain the transmission ratio R and then proceeds to step S68. In step S68, the controller 42 determines whether the assist state A is the first assist state A1. In step S68, in a case where the controller 42 determines that the assist state A is the first assist state A1, the controller 42 proceeds to step S67. In step S67, the controller 42 controls the motor 12 so that the assist state A is changed from the first assist state A1 to the second assist state A2. Then, the controller 42 ends the process. The control device 40 configured to control the transmission 18 and the motor 12 in accordance with the predetermined condition of the eighth example restricts changing of the transmission ratio R in a case where the human driving force H is large. This avoids failures that can be caused in a case where a large load is applied to the transmission 18 during shifting by the transmission 18. The control device 40 configured to control the transmission 18 and the motor 12 in accordance with the predetermined condition of the eighth example restricts changing of the transmission ratio R even in a case where the peak value HP of the human driving force H becomes less than the first threshold value XA immediately after the peak value HP of the human driving force H becomes greater than or equal to the first threshold value XA. This avoids failures that can be caused in a case where a large load is applied to the transmission 18 during shifting by the transmission 18.

Second Embodiment

Figure 2:
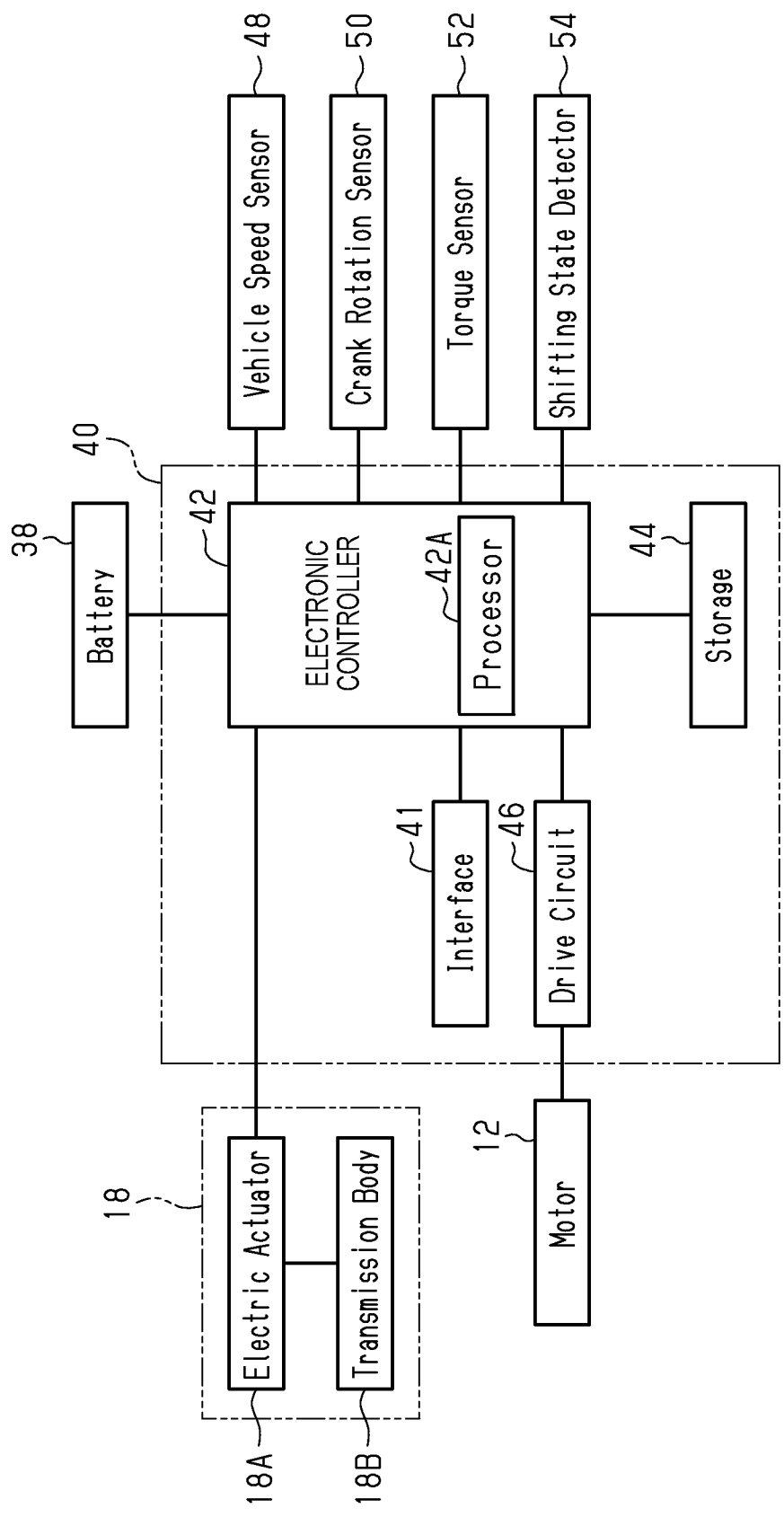
FIG. 2 is a block diagram showing the electrical configuration of the human-powered vehicle shown in FIG. 1.
Figure 9:
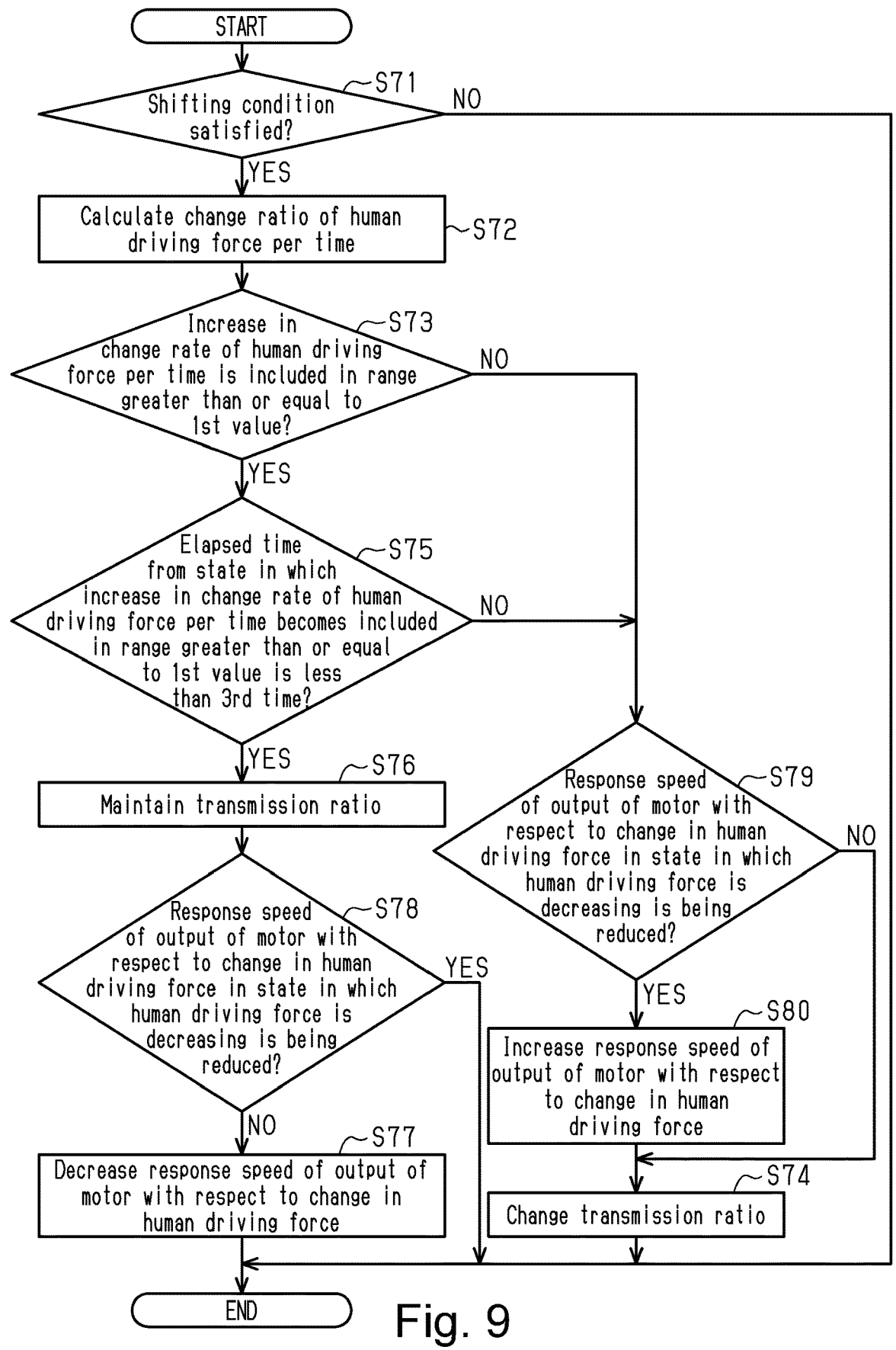
FIG. 9 is a flowchart illustrating one example of a control process executed by an electronic controller of a control device in accordance with a second embodiment.

The control device 40 in accordance with a second embodiment will now be described with reference to FIGS. 1, 2, and 9. Same reference numerals are given to those components that are the same as the corresponding components of the first embodiment. Such components will not be described in detail. The control device 40 of the second embodiment includes hardware having the same configuration as that of the control device 40 in the first embodiment.

The human-powered vehicle 10 including the control device 40 of the second embodiment has the motor 12 configured to apply propulsion force to the human-powered vehicle 10, the crank axle 14A, the driving wheel 16A, and the transmission 18 configured to automatically change the transmission ratio of the rotational speed of the driving wheel 16A to the rotational speed of the crank axle 14A in accordance with the travel state of the human-powered vehicle 10. The control device 40 includes the controller 42 configured to control the transmission 18. The controller 42 is configured to control the transmission 18 to maintain the transmission ratio R in a case where a change rate per time of the human driving force H input to the crank axle 14A satisfies the predetermined condition. In the second embodiment, the controller 42 can be configured to change the assist state A of the motor 12 in accordance with the human driving force H in the same manner as the first embodiment. In one example, the predetermined condition includes a ninth example or a tenth example.

The predetermined condition of the ninth example includes a case where an increase in the change rate of the human driving force H per time is included in a range greater than or equal to a first value YA. The predetermined condition of the ninth example is satisfied in a case where an increase in the change rate of the human driving force H per time is included in a range greater than or equal to the first value YA. The first value YA is, for example, an upper limit value of an increase in the change rate of the human driving force H per time allowing the transmission ratio R to be changed in a preferred manner. The predetermined condition of the tenth example includes a case where the elapsed time is within a third time TC from a state in which an increase in the change rate of the human driving force H per time becomes included in a range greater than or equal to the first value YA. The predetermined condition of the tenth example is satisfied in a case where the elapsed time is within the third time TC from a state in which an increase in the change rate of the human driving force H per time becomes included in a range greater than or equal to the first value YA. The third time TC is, for example, the expected time for an increase in the change rate of the human driving force H per time that becomes included in a range greater than or equal to the first value YA to change to a range less than the first value YA. In the predetermined conditions of the ninth and tenth examples, the human driving force H can be the human torque TH or the human force-based power WH. In the predetermined conditions of the ninth and tenth examples, the change rate of the human driving force H per time is, for example, a change rate of the human driving force H per one to three seconds. The first value YA is, for example, a value in a range greater than or equal to 1.3. The first value YA can be, for example, 2. The first value YA can be, for example, 70 or 500. The third time TC is, for example, a value in a range greater than or equal to ten seconds and less than or equal to ten minutes.

In a case where the human driving force H is the human torque TH, it is preferred that the predetermined first value YA include a change rate of a case where the human driving force H changes from a value that is greater than or equal to 10 Nm and less than or equal to 20 Nm to a value that is greater than or equal to 40 Nm and less than or equal to 50 Nm during one to three seconds. In a case where the human driving force H is the human torque TH, it is preferred that the predetermined first value YA include a change rate of a case where the human driving force changes from a value that is greater than or equal to 40 Nm and less than or equal to 50 Nm to a value that is greater than or equal to 70 Nm and less than or equal to 120 Nm during one to three seconds. In a case where the human driving force H is the human torque TH, it is preferred that the predetermined first value YA include a change rate of a case where the human driving force H changes from 0 Nm to a value that is greater than or equal to 70 Nm and less than or equal to 140 Nm during one to three seconds.

In a case where the human driving force H is the human force-based power WH, it is preferred that the predetermined first value YA include a change rate of a case where the human driving force changes from a value that is greater than or equal to 100 W and less than or equal to 130 W to a value that is greater than or equal to 180 W and less than or equal to 200 W during one to three seconds. In a case where the human driving force H is the human force-based power WH, it is preferred that the predetermined first value YA include a change rate of a case where the human driving force changes from a value that is greater than or equal to 150 W and less than or equal to 180 W to a value that is greater than or equal to 250 W and less than or equal to 350 W during one to three seconds. In a case where the human driving force H is the human force-based power WH, it is preferred that the predetermined first value YA include a change rate of a case where the human driving force H changes from 0 W to a value that is greater than or equal to 500 W and less than or equal to 1000 W during one to three seconds.

Preferably, in a case where the change rate per time of the human driving force H input to the crank axle 14A satisfies the predetermined condition, the controller 42 is configured to decrease a response speed of the output of the motor 12 with respect to a change in the human driving force H in a state in which the human driving force H is decreasing.

One example of a control process executed by the controller 42 in accordance with the predetermined condition of the tenth example will now be described with reference to FIG. 9. In a case where electric power is supplied to the controller 42, the controller 42 starts the process from step S71 of the flowchart shown in FIG. 9. In a case where the process of the flowchart in FIG. 9 ends, the controller 42 repeats the process from step S71 in predetermined cycles until the supply of electric power ends.

In step S71, the controller 42 executes the same process as step S11 shown in FIG. 3. In step S71, in a case where the controller 42 determines that the predetermined shifting condition is not satisfied, the controller 42 ends the process. In step S71, in a case where the controller 42 determines that the predetermined shifting condition is satisfied, the controller 42 proceeds to step S72.

In step S72, the controller 42 calculates the change rate of the human driving force H per time based on the human torque TH obtained from the torque sensor 52 and then proceeds to step S73. In step S73, the controller 42 determines whether an increase in the change rate of the human driving force H per time is included in a range greater than or equal to the first value YA. In step S73, in a case where the controller 42 determines that an increase in the change rate of the human driving force H per time is not included in a range less than the first value YA, the controller 42 proceeds to step S79.

In step S79, the controller 42 determines whether the response speed of the output of the motor 12 with respect to a change in the human driving force H in a state in which the human driving force H is decreasing is being reduced. In step S79, in a case where the controller 42 determines that the response speed of the output of the motor 12 with respect to a change in the human driving force H in a state in which the human driving force H is decreasing is not being reduced, the controller 42 proceeds to step S74. In step S79, in a case where the controller 42 determines that the response speed of the output of the motor 12 with respect to a change in the human driving force H in a state in which the human driving force H is decreasing is being reduced, the controller 42 proceeds to step S80. In step S80, the controller 42 increases the response speed of the output of the motor 12 with respect to a change in the human driving force H in a state in which the human driving force H is decreasing and then proceeds to step S74. In step S74, the controller 42 changes the transmission ratio R in accordance with the predetermined shifting condition. In step S73, in a case where the controller 42 determines that an increase in the change rate of the human driving force H per time is included in a range greater than or equal to the first value YA, the controller 42 proceeds to step S75.

In step S75, the controller 42 determines whether the elapsed time is less than the third time TC from a state in which an increase in the change rate of the human driving force H per time becomes included in a range greater than or equal to the predetermined first value YA. In step S75, in a case where the controller 42 determines that the elapsed time is greater than or equal to the third time TC from a state in which an increase in the change rate of the human driving force H per time becomes included in a range greater than or equal to the predetermined first value YA, the controller 42 proceeds to step S79. In step S75, in a case where the controller 42 determines that the elapsed time is less than the third time TC from a state in which an increase in the change rate of the human driving force H per time becomes included in a range greater than or equal to the predetermined first value YA, the controller 42 proceeds to step S76.

In step S76, the controller 42 controls the transmission 18 to maintain the transmission ratio R and then proceeds to step S78. In step S78, the controller 42 determines whether the response speed of the output of the motor 12 with respect to a change in the human driving force H in a state in which the human driving force H is decreasing is being reduced. In step S78, in a case where the controller 42 determines that the response speed of the output of the motor 12 with respect to a change in the human driving force H in a state in which the human driving force H is decreasing is not being reduced, the controller 42 proceeds to step S77. In step S78, in a case where the controller 42 determines that the response speed of the output of the motor 12 with respect to a change in the human driving force H in a state in which the human driving force H is decreasing is being reduced, the controller 42 ends the process. In step S77, the controller 42 decreases the response speed of the output of the motor 12 with respect to a change in the human driving force H in a state in which the human driving force H is decreasing and then ends the process. The control process executed by the controller 42 in accordance with the predetermined condition of the ninth example corresponds to, for example, a process in which step S75 is omitted from the flowchart shown in FIG. 9. If step S75 is omitted from the flowchart shown in FIG. 9, in a case where the controller 42 determines that an increase in the change rate of the human driving force H per time is included in a range greater than or equal to the first value YA in step S73, the controller 42 proceeds to step S76. The control device 40 of the present embodiment restricts changing of the transmission ratio R in a case where the human driving force H suddenly increases. This avoids failures that can be caused in a case where a large load is applied to the transmission 18 during shifting by the transmission 18.

Third Embodiment

The control device 40 in accordance with a third embodiment will now be described with reference to FIGS. 1, 2, 10 and 11. Same reference numerals are given to those components that are the same as the corresponding components of the first embodiment. Such components will not be described in detail. The control device 40 of the third embodiment includes hardware having the same configuration as that of the control device 40 in the first embodiment.

The human-powered vehicle 10 including the control device 40 of the third embodiment has the motor 12 configured to apply propulsion force to the human-powered vehicle 10. The control device 40 includes the controller 42 configured to control the motor 12 in accordance with the human driving force H input to the human-powered vehicle 10. The controller 42 is configured to change the assist state A related to at least one of the assist ratio X of the assist force M generated by the motor 12 to the predetermined human driving force H and the assist force M generated by the motor 12 in accordance with the human driving force H. The assist state A includes the first assist state A1 and the second assist state A2 having the maximum value of the assist ratio X or the upper limit value MX of the assist force M that is greater than the first assist state A1. The controller 42 is configured to switch between the first assist state A1 and the second assist state A2 in accordance with the change rate of the human driving force H per time. The change rate of the human driving force H per time is, for example, a change rate of the human driving force H per second.

Preferably, the controller 42 is configured to switch the assist state A from the first assist state A1 to the second assist state A2 in a case where an increase in the change rate of the human driving force H per time is a predetermined second value YB or greater. The second value YB is, for example, a value that allows for determination of a case where it is preferred to increase the assist ratio X or the assist force M. The case where it is preferred to increase the assist ratio X or the assist force M is, for example, a case where an increase in the change rate of the human driving force H per time is sufficiently large. The change rate of the human driving force H per time is, for example, a change rate of the human driving force H per one to three seconds. The second value YB is, for example, a value in a range greater than or equal to 1.3. The second value YB can be, for example, 2. The second value YB can be, for example, 70 or 500. Preferably, in a case where the controller 42 switches from the first assist state A1 to the second assist state A2, the controller 42 is configured to decrease the response speed of the output of the motor 12 with respect to a change in the human driving force H in a state in which the human driving force H is decreasing. Preferably, the controller 42 configured to switch the assist state A from the second assist state A2 to the first assist state A1 in a case where a decrease in the change rate of the human driving force H per time is a predetermined third value YC or greater. In one example, the third value YC is a value that allows for determination of a case where it is preferred to decrease the assist ratio X and the assist force M because a decrease in the change rate of the human driving force H per time is sufficiently large. Preferably, in a case where the controller 42 switches from the second assist state A2 to the first assist state A1, the controller 42 is configured to increase the response speed of the output of the motor 12 with respect to a change in the human driving force H in a state in which the human driving force H is decreasing.

Figure 10:
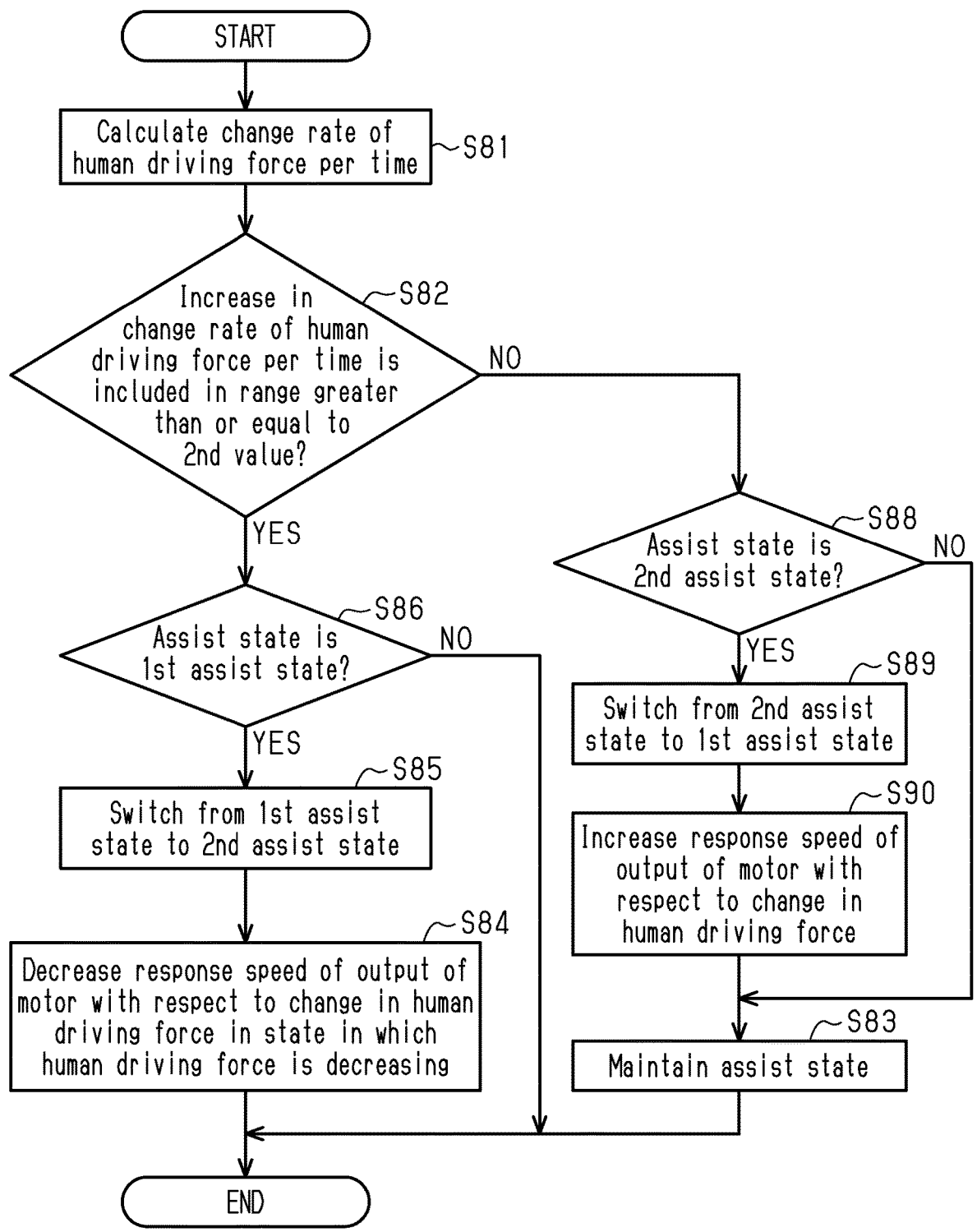
FIG. 10 is a flowchart illustrating one example of a control process executed by an electronic controller of a control device in accordance with a third embodiment.

One example of a control process executed by the controller 42 will now be described with reference to FIG. 10. In a case where electric power is supplied to the controller 42, the controller 42 starts the process from step S81 of the flowchart shown in FIG. 10. In a case where the process of the flowchart in FIG. 10 ends, the controller 42 repeats the process from step S81 in predetermined cycles until the supply of electric power ends.

In step S81, the controller 42 calculates the change rate of the human driving force H per time based on the human torque TH obtained from the torque sensor 52 and then proceeds to step S82. In step S82, the controller 42 determines whether an increase in the change rate of the human driving force H per time is included in a range greater than or equal to the second value YB. The human driving force H can be the human torque TH or the human force-based power WH. In step S82, in a case where the controller 42 determines that an increase in the change rate of the human driving force H per time is included in a range greater than or equal to the second value YB, the controller 42 proceeds to step S86.

In step S86, the controller 42 determines whether the assist state A is the first assist state A1. In step S86, in a case where the controller 42 determines that the assist state A is the first assist state A1, the controller 42 proceeds to step S85. In step S86, in a case where the controller 42 determines that the assist state A is not the first assist state A1, the controller 42 ends the process. In step S85, the controller 42 controls the motor 12 so that the assist state A is changed from the first assist state A1 to the second assist state A2. Then, the controller 42 proceeds to step S84.

In step S84, the controller 42 decreases the response speed of the output of the motor 12 with respect to a change in the human driving force H in a state in which the human driving force H is decreasing. The order of performance of step S84 and step S85 can be switched. Further, the controller 42 can execute step S84 and step S85 simultaneously.

In step S82, in a case where the controller 42 determines that an increase in the change rate of the human driving force H per time is not included in a range less than the second value YB, the controller 42 proceeds to step S88. In step S88, the controller 42 determines whether the assist state A is the second assist state A2. In step S88, in a case where the controller 42 determines that the assist state A is the second assist state A2, the controller 42 proceeds to step S89. In step S89, the controller 42 controls the motor 12 so that the assist state A is changed from the second assist state A2 to the first assist state A1. Then, the controller 42 proceeds to step S90. In step S90, the controller 42 increases the response speed of the output of the motor 12 with respect to a change in the human driving force H in a state in which the human driving force H is decreasing and then proceeds to step S83. In step S88, in a case where the controller 42 determines that the assist state A is not the second assist state A2, the controller 42 proceeds to step S83. In step S83, the controller 42 controls the motor 12 to maintain the assist state A.

With the control device 40 of the present embodiment, in a case where the human driving force H suddenly increases, the controller 42 is configured to change the assist state A from the first assist state A1 to the second assist state A2 and decrease the response speed of the output of the motor 12 with respect to a change in the human driving force H in a state in which the human driving force H is decreasing. This improves the riding comfort of a rider on the human-powered vehicle 10.

Figure 11:
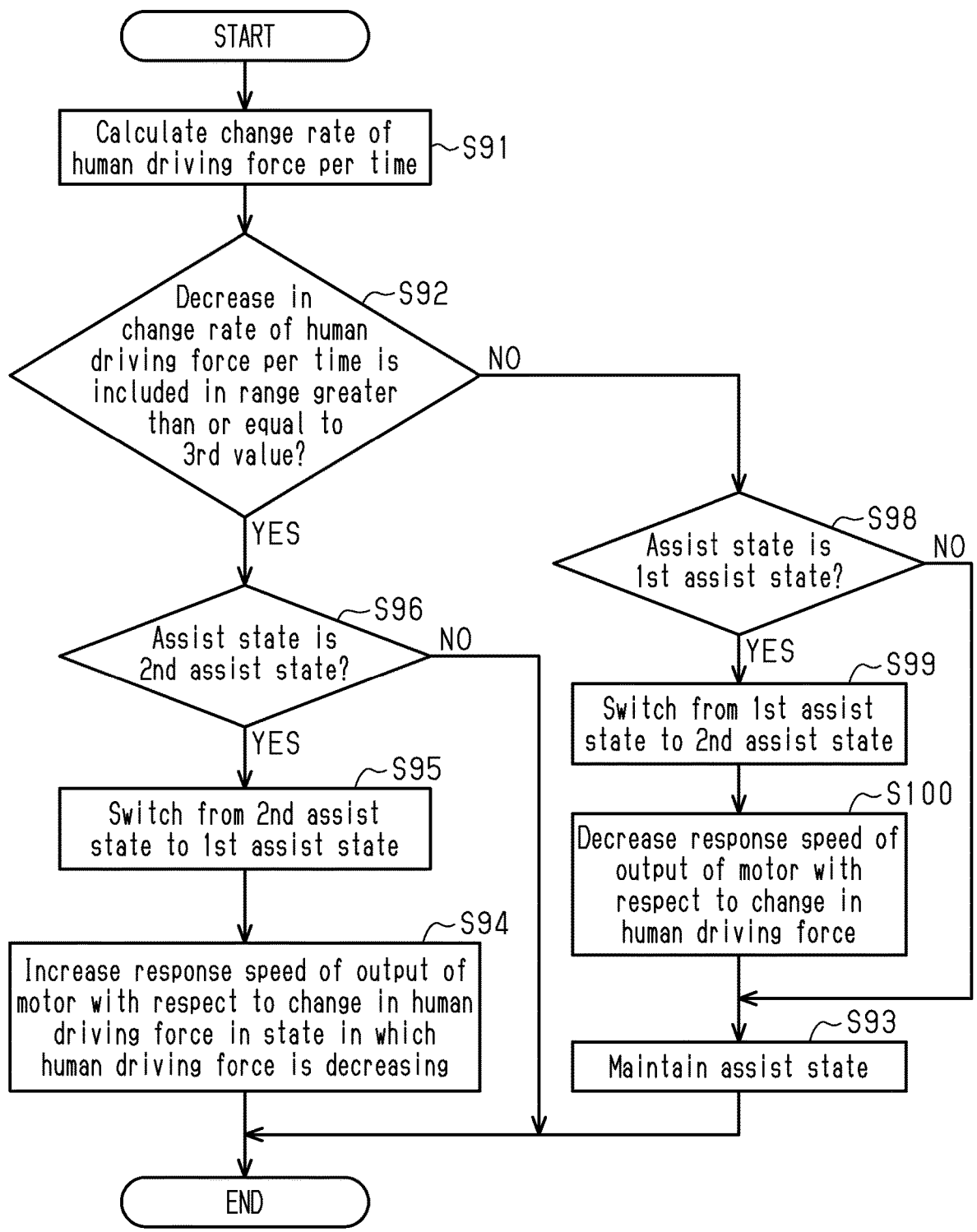
FIG. 11 is a flowchart illustrating another example of the control process executed by the electronic controller of the control device in accordance with the third embodiment.

Another example of a control process executed by the controller 42 will now be described with reference to FIG. 11. In a case where electric power is supplied to the controller 42, the controller 42 starts the process from step S91 of the flowchart shown in FIG. 11. In a case where the process of the flowchart in FIG. 11 ends, the controller 42 repeats the process from step S91 in predetermined cycles until the supply of electric power ends.

In step S91, the controller 42 calculates the change rate of the human driving force H per time based on the human torque TH obtained from the torque sensor 52 and then proceeds to step S92. In step S92, the controller 42 determines whether a decrease in the change rate of the human driving force H per time is included in a range greater than or equal to the third value YC. The human driving force H can be the human torque TH or the human force-based power WH. In step S92, in a case where the controller 42 determines that a decrease in the change rate of the human driving force H per time is included in a range greater than or equal to the third value YC, the controller 42 proceeds to step S96.

In step S96, the controller 42 determines whether the assist state A is the second assist state A2. In step S96, in a case where the controller 42 determines that the assist state A is the second assist state A2, the controller 42 proceeds to step S95. In step S96, in a case where the controller 42 determines that the assist state A is not the second assist state A2, the controller 42 ends the process. In step S95, the controller 42 controls the motor 12 so that the assist state A is changed from the second assist state A2 to the first assist state A1. Then, the controller 42 proceeds to step S94.

In step S94, the controller 42 increases the response speed of the output of the motor 12 with respect to a change in the human driving force H in a state in which the human driving force H is decreasing. The order of performance of step S94 and step S95 can be switched. Further, the controller 42 can execute step S94 and step S95 simultaneously.

In step S92, in a case where the controller 42 determines that a decrease in the change rate of the human driving force H per time is not included in a range less than the third value YC, the controller 42 proceeds to step S98. In step S98, the controller 42 determines whether the assist state A is the first assist state A1. In step S98, in a case where the controller 42 determines that the assist state A is the first assist state A1, the controller 42 proceeds to step S99. In step S99, the controller 42 controls the motor 12 so that the assist state A is changed from the first assist state A1 to the second assist state A2. Then, the controller 42 proceeds to step S100. In step S100, the controller 42 decreases the response speed of the output of the motor 12 with respect to a change in the human driving force H in a state in which the human driving force H is decreasing and then proceeds to step S93. In step S98, in a case where the controller 42 determines that the assist state A is not the second assist state A2, the controller 42 proceeds to step S93. In step S93, the controller 42 controls the motor 12 to maintain the assist state A. With the control device 40 of the present embodiment, in a case where the human driving force H suddenly decreases, the controller 42 is configured to change the assist state A from the second assist state A2 to the first assist state A1 and increase the response speed of the output of the motor 12 with respect to a change in the human driving force H in a state in which the human driving force H is decreasing. This allows a rider to smoothly stop the human-powered vehicle 10.

Modifications

The description related with the above embodiments exemplifies, without any intention to limit, an applicable form of a human-powered vehicle control device according to the present disclosure. In addition to the embodiments described above, the human-powered vehicle control device according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

In the first embodiment or embodiments including the modifications of the first embodiment, the predetermined condition can be satisfied in a case where the peak value HP of the human driving force H is included in a range less than or equal to a third threshold value XC. The third threshold value XC is, for example, a value allowing for a determination that a rider has an intension to stop the human-powered vehicle 10. In another example, the third threshold value XC is a value allowing for a determination that a rider has an intension to slow down the human-powered vehicle 10. The third threshold value XC is a value less than the first threshold value XA and the second threshold value XB. The third threshold value XC is, for example, a value in a range less than or equal to 10 Nm. The third threshold value XC is, for example, 5 Nm.

In the embodiments and modifications, in a case where the parameter PB related to the human driving force H satisfies the predetermined condition, the controller 42 can be configured to change the assist state from a non-assist state to the assist state. In the flowcharts shown in FIGS. 3, 4, 5, 6, 7, 8, 9, 10, and 11, the controller 42 is, for example, configured to change the first assist state to the non-assist state and change the second assist state to the assist state. In the non-assist state, the controller 42 can be configured to control the motor 12 so that the propulsion force by the motor 12 is not applied to the human-powered vehicle 10 or configured not to control the motor 12.

In the embodiments and the modifications, the controller 42 can include two operation modes, namely, a non-assist mode and an assist mode. In the non-assist mode, the controller 42 can be configured to control the motor 12 so that the propulsion force by the motor 12 is not applied to the human-powered vehicle 10 or configured not to control the motor 12. In a case where the assist mode is selected, the controller 42 can be configured to start the processes of the flowcharts shown in FIGS. 3, 4, 5, 6, 7, 8, 9, 10, and 11. In a case where the non-assist mode is selected, the controller 42 can be configured to end the processes of the flowcharts shown in FIGS. 3, 4, 5, 6, 7, 8, 9, 10, and 11.

In the embodiments and the modifications, a condition that is "greater than or equal to a threshold value" can be changed to a condition that "exceeds a threshold value". In the embodiments and the modifications, a condition that is "greater than or equal to a predetermined value" can be changed to a condition that "exceeds a predetermined value". In the embodiments and the modifications, a condition that is "lower than or equal to a predetermined value" can be changed to a condition that is "less than a predetermined value". In the embodiments and the modifications, a condition that is "less than a threshold value" can be changed to a condition that is "less than or equal to a threshold value".

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device for a human-powered vehicle including a motor configured to apply a propulsion force to the human-powered vehicle, a crank axle, a driving wheel, and a transmission configured to be controlled to automatically change a transmission ratio of a rotational speed of the driving wheel to a rotational speed of the crank axle, the control device comprising:
    an electronic controller configured to control the motor in accordance with a human driving force input to the crank axle and further configured to control the transmission to automatically change the transmission ratio upon determining that a shifting condition is satisfied,
    the electronic controller being further configured to change an assist state related to at least one of an assist ratio of an assist force generated by the motor to a predetermined human driving force and the assist force generated by the motor in accordance with the human driving force, and
    the electronic controller being further configured to control the transmission to maintain the transmission ratio even when the shifting condition is satisfied upon determining that a peak value of the human driving force satisfies a predetermined condition, the peak value of the human driving force being a maximum value of the human driving force during a single rotation or a half rotation of the crank.

2. The control device according to claim 1, wherein
the electronic controller is configured to determine the predetermined condition is satisfied upon determining that the peak value of the human driving force is included in a range greater than or equal to a first threshold value.

3. The control device according to claim 2, wherein
the electronic controller is configured to determine the predetermined condition is satisfied upon determining the peak value of the human driving force is included in a range greater than or equal to a second threshold value that is smaller than the first threshold value after the peak value of the human driving force becomes greater than or equal to the first threshold value.

4. The control device according to claim 1, wherein
the electronic controller is configured to determine the predetermined condition is satisfied over a first time from a state in which the peak value of the human driving force becomes included in a range greater than or equal to a first threshold value.

5. The control device according to claim 1, wherein
the electronic controller is configured to determine the predetermined condition is satisfied upon determining the peak value of the human driving force is included in a range greater than or equal to a first threshold value successively for a predetermined first number of occurrences.

6. The control device according to claim 1, wherein
the electronic controller is configured to determine the predetermined condition is satisfied upon determining the peak value of the human driving force is included in a range greater than or equal to a second threshold value that is smaller than a first threshold value after the peak value of the human driving force is included in a range greater than or equal to the first threshold value successively for a predetermined first number of occurrences.

7. The control device according to claim 1, wherein
the electronic controller is configured to determine the predetermined condition is satisfied after the peak value of the human driving force is included in a range greater than or equal to a first threshold value successively for a predetermined first number of occurrences until the peak value of the human driving force is included in a range less than a second threshold value that is smaller than the first threshold value successively for a predetermined second number of occurrences.

8. The control device according to claim 1, wherein
the electronic controller is configured to determine the predetermined condition is satisfied over a second time from a state in which the peak value of the human driving force becomes included in a range greater than or equal to a first threshold value successively for a predetermined first number of occurrences.

9. The control device according to claim 1, wherein
the electronic controller is configured to determine the predetermined condition is satisfied after the peak value of the human driving force becomes greater than or equal to a first threshold value until the peak value of the human driving force is included in a range less than a second threshold value that is smaller than the first threshold value successively for a predetermined second number of occurrences.

10. The control device according to claim 1, wherein
the assist state includes a first assist state and a second assist state having at least one of a maximum value of the assist ratio and an upper limit value of the assist force that is greater than that of the first assist state, and
the electronic controller is configured to switch between the first assist state and the second assist state in accordance with the human driving force.

11. The control device according to claim 10, wherein
the electronic controller is configured to change the assist state from the first assist state to the second assist state upon determining the peak value of the human driving force satisfies the predetermined condition.

12. A control device for a human-powered vehicle including a motor configured to apply a propulsion force to the human-powered vehicle, a crank axle, a driving wheel, and a transmission configured to be controlled to automatically change a transmission ratio of a rotational speed of the driving wheel to a rotational speed of the crank axle, the control device comprising:
an electronic controller configured to
determine whether a shifting condition is satisfied,
control the transmission to automatically change the transmission ratio upon determining that the shifting condition is satisfied,
determine whether a change rate per time of a human driving force input to the crank axle satisfies a predetermined condition, and
control the transmission to maintain the transmission ratio even when the shifting condition is satisfied upon determining the change rate per time of the human driving force input to the crank axle satisfies the predetermined condition,
the electronic controller being configured to determine that the predetermined condition is satisfied when an elapsed amount of time since an increase in the change rate of the human driving force per time became included in a range greater than or equal to a predetermined first value is equal to or smaller than a third amount of time.

13. The control device according to claim 12, wherein
the electronic controller is configured to decrease a response speed of output of the motor with respect to a change in the human driving force in a state in which the human driving force is decreasing upon determining the change rate per time of the human driving force input to the crank axle satisfies the predetermined condition.

14. The control device according to claim 12, wherein
the third amount of time is equal to or larger than ten seconds and smaller than or equal to ten minutes.

15. A control device for a human-powered vehicle including a motor configured to apply a propulsion force to the human-powered vehicle, the control device comprising:
an electronic controller configured to control the motor in accordance with human driving force input to the human-powered vehicle,
the electronic controller being further configured to change an assist state related to at least one of an assist ratio of an assist force generated by the motor to a predetermined human driving force and the assist force generated by the motor in accordance with the human driving force, the assist state including a first assist state and a second assist state having a maximum value of the assist ratio or an upper limit value of the assist force that is greater than that of the first assist state, and the electronic controller being further configured to calculate a change rate of the human driving force per time and switch between the first assist state and the second assist state in accordance with the change rate of the human driving force per time, the electronic controller being further configured to increase a response speed of output of the motor with respect to a change in the human driving force in a state in which the human driving force is decreasing upon switching from the second assist state to the first assist state.

16. The control device according to claim 15, wherein the electronic controller is configured to switch the assist state from the first assist state to the second assist state upon determining an increase in the change rate of the human driving force per time is a predetermined second value or greater.

17. The control device according to claim 16, wherein the electronic controller is configured to decrease a response speed of output of the motor with respect to a change in the human driving force in a state in which the human driving force is decreasing upon switching from the first assist state to the second assist state.

18. The control device according to claim 15, wherein the electronic controller is configured to switch the assist state from the second assist state to the first assist state upon determining a decrease in the change rate of the human driving force per time is a predetermined third value or greater.

19. A control device for a human-powered vehicle including a motor configured to apply a propulsion force to the human-powered vehicle, the control device comprising:

an electronic controller configured to control the motor in accordance with human driving force input to the human-powered vehicle, the electronic controller being further configured to change an assist state related to at least one of an assist ratio of an assist force generated by the motor to a predetermined human driving force and the assist force generated by the motor in accordance with the human driving force, the assist state including a first assist state and a second assist state having a maximum value of the assist ratio or an upper limit value of the assist force that is greater than that of the first assist state, and the electronic controller being further configured to calculate a change rate of the human driving force per time and switch between the first assist state and the second assist state in accordance with the change rate of the human driving force per time, the electronic controller being configured to decrease a response speed of output of the motor when the assist state is switched from the first assist state to the second assist state and to increase the response speed when the assist state is switched from the second assist state to the first assist state.

\* \* \* \* \*